US012375869B2

(12) United States Patent
Allen et al.

(10) Patent No.: US 12,375,869 B2
(45) Date of Patent: Jul. 29, 2025

(54) EFFICIENT MULTI-EMITTER SOUNDFIELD REVERBERATION

(71) Applicant: Microsoft Technology Licensing, LLC, Redmond, WA (US)

(72) Inventors: Andrew Stewart Allen, San Diego, CA (US); Nikunj Raghuvanshi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 18/169,759

(22) Filed: Feb. 15, 2023

(65) Prior Publication Data

US 2024/0276172 A1 Aug. 15, 2024

(51) Int. Cl.

| | |
|---|---|
| ***H04S 7/00*** | (2006.01) |
| ***G10L 19/008*** | (2013.01) |
| ***H04R 5/033*** | (2006.01) |
| ***H04S 3/00*** | (2006.01) |

(52) U.S. Cl.

CPC ............ *H04S 7/306* (2013.01); *G10L 19/008* (2013.01); *H04R 5/033* (2013.01); *H04S 3/008* (2013.01); *H04S 7/304* (2013.01); *H04S 2400/01* (2013.01); *H04S 2400/11* (2013.01); *H04S 2400/13* (2013.01)

(58) Field of Classification Search

CPC .......... H04S 7/306; H04S 7/307; H04S 3/008; H04S 7/304; H04S 2400/01; H04S 2400/11; H04S 2400/13; G10K 15/12; G10L 19/008; H04R 5/033

USPC .......................................................... 381/303

See application file for complete search history.

(56) References Cited

U.S. PATENT DOCUMENTS

2012/0093320 A1* 4/2012 Flaks ...................... H04S 7/304 381/17
2018/0035233 A1 2/2018 Fielder
2022/0264244 A1 8/2022 Davidson

OTHER PUBLICATIONS

Invitation to Pay Additional Fees received for PCT Application No. PCT/US2024/014908, May 24, 2024, 12 pages.
International Search Report and Written Opinion received for PCT Application No. PCT/US2024/014908, Jul. 12, 2024, 21 pages.

* cited by examiner

*Primary Examiner* — Paul Kim
(74) *Attorney, Agent, or Firm* — Workman Nydegger

(57) ABSTRACT

Techniques for generating a simulated reverberation sound signal are disclosed. This simulated reverberation sound signal operates as a reverberation effect for a sound associated with a source. The simulated reverberation sound signal is generated using a truncated sound signal that (i) repeats in a decaying manner over time, (ii) has a perceivable arrival direction that approximates where the sound originated, and (iii) has a given shape on a sound sphere.

17 Claims, 15 Drawing Sheets

EFFICIENT MULTI-EMITTER SOUNDFIELD REVERBERATION

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system can be used to display various different types of information to a user. Some of that information is displayed in the form of augmented reality or virtual reality content, which can also be referred to as a "hologram." That is, as used herein, the term "hologram" generally refers to image content that is displayed by the MR system. In some instances, the hologram can have the appearance of being a three-dimensional (3D) object while in other instances the hologram can have the appearance of being a two-dimensional (2D) object.

The MR system is not only able to display the hologram but it is also able to playback audio associated with that hologram. For instance, if the hologram is a person clapping his/her hands, the MR system can play a sound representative of that clapping action.

The audio can be rendered in a manner so as to give the illusion that the sound is originating at the location where the hologram is being played. This playback can occur in a 360 degree sound sphere around the user. Also, this playback can occur even though the MR system has a limited number of speakers.

In addition to playing sound for a hologram, the MR system can also provide a reverberation effect for that sound. As used herein, the term "reverberation" refers to the prolongation of a particular sound or to the continued effect or repercussion that is associated when a sound occurs.

Rendering reverberation per source (aka "hologram" or "emitter") is extremely costly, both in terms of memory and computation, because rendering reverberation usually involves a long-duration partition convolution, which requires a fast Fourier Transform (FFT) and an inverse FFT (IFFT) as well as many frames of convolution (i.e. complex multiplication) per each source. As used here, the term "convolution" refers to the process of combining multiple signals to create a new signal. Rendering per source reverberation also requires a large amount of memory to store all of the convolution terms; it also requires a circulating input buffer per source. For a small number of sources, the MR system can perform the needed rendering, however, as the number of sources increases, the rendering process can quickly cause performance problems. It is also often the case that a majority of the available processor usage or availability should be reserved for handling the visualization of the imagery, leaving little compute left to handle the sound effects (e.g., about 10% of the compute is reserved for audio at any given time). What is needed, therefore, is a technique to alleviate this reverberation computational bottleneck by providing a scalable, multi-channel, and multi-emitter reverberation component that has a fixed runtime cost and minimal per-source computation requirements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein generate a simulated reverberation sound signal that operates as a reverberation effect for a sound associated with a source (e.g., a hologram). The simulated reverberation sound signal is generated using a truncated sound signal that (i) repeats in a decaying manner over time, (ii) has a perceivable arrival direction that approximates where the sound originated, and (iii) has a given shape on a sound sphere.

Some embodiments receive input corresponding to a sound signal that is generated for a source. The embodiments determine that a reverberation effect is to be generated for the sound signal. This reverberation effect includes a simulated reverberation sound signal that is generated from a combination of multiple different channel signals generated by a set of filters operating on the input. The embodiments apply a set of spatial gains (aka spatial gain coefficients) to the multiple different channel signals to generate a perceivable direction and a perceivable spread that will be provided for a desired T60 decay time duration (and for the simulated reverberation sound signal). The embodiments apply a set of decay rate gains (aka decay rate coefficients) to the multiple different channel signals to generate a blended effect that will be provided for the simulated reverberation sound signal. The embodiments use a feedback loop to generate a truncated reverberation sound segment. The feedback loop generates the truncated reverberation sound segment by repeatedly convolving the truncated reverberation sound segment with itself multiple times and by causing each repeated version of the truncated reverberation sound segment to decay over time. The embodiments convolve the truncated reverberation sound segment with the sound signal and with the multiple different channel signals to create a playable sound signal comprising the reverberation effect for the sound.

Some embodiments simulate multi-emitter spatial reverberation. For instance, such embodiments obtain one or more impulse responses associated with one or more audio signals. These embodiments partition the impulse response into a plurality of impulse response partitions. Each of these impulse response partitions is associated with a respective time segment, decay time, and looping time. The embodiments loop these impulse response partitions while recursively applying a respective feedback filter for each impulse response partition. Furthermore, each respective feedback filter is based at least upon the respective decay time and looping time of its corresponding impulse response partition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
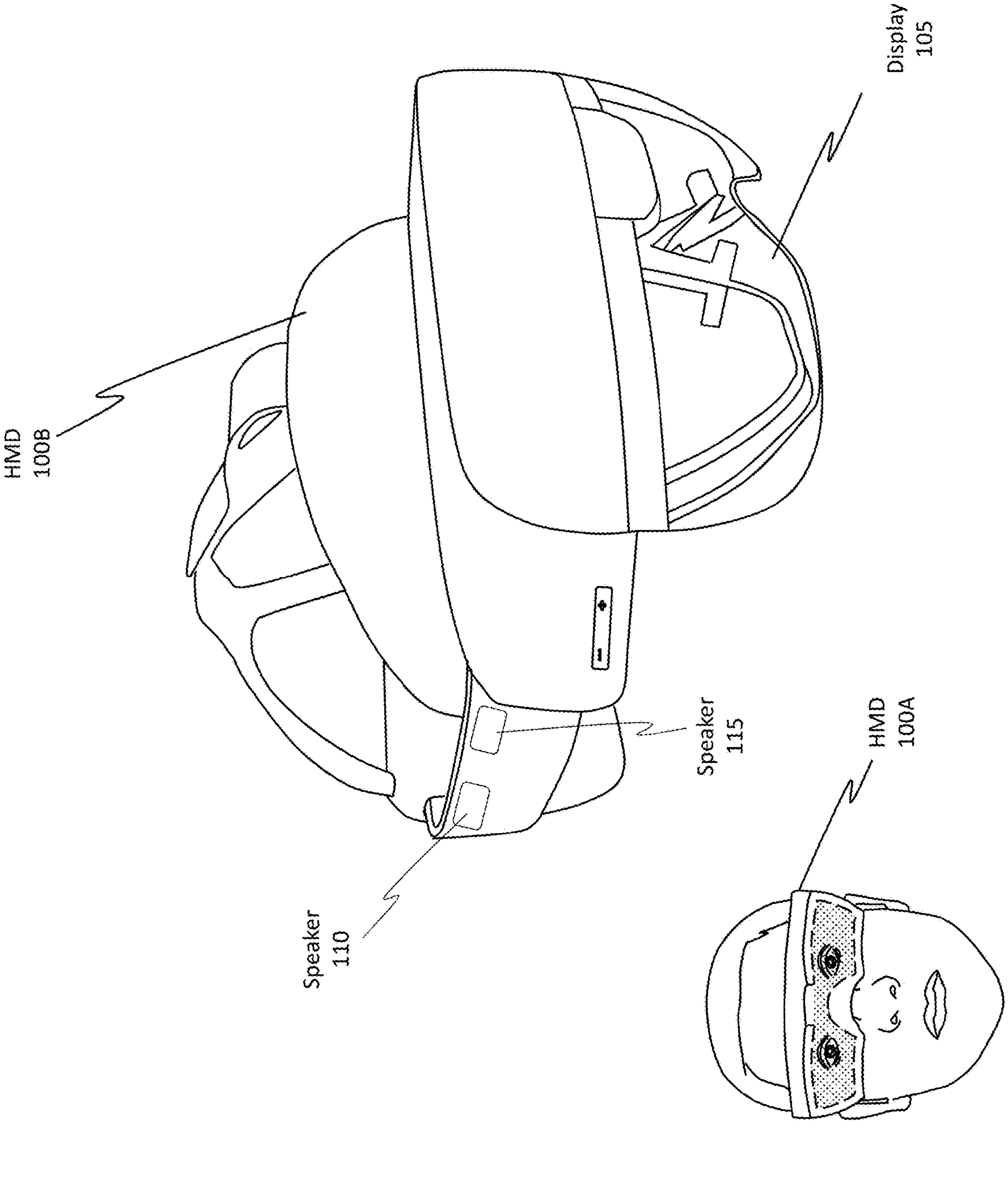
FIG. 1 illustrates an example of a mixed-reality (MR) device comprising a head mounted device (HMD).

Embodiments disclosed herein generate a simulated reverberation sound signal that operates as a reverberation effect for a sound associated with a source. The simulated reverberation sound signal is generated using a truncated sound signal that (i) repeats in a decaying manner over time, (ii) has a perceivable arrival direction that approximates where the sound originated, and (iii) has a given shape on a sound sphere.

Some embodiments receive input corresponding to a sound signal that is generated for a source. The embodiments determine that a reverberation effect is to be generated for the sound signal. This reverberation effect includes a simulated reverberation sound signal that is generated from a combination of multiple different channel signals generated by a set of filters operating on the input. The embodiments apply a set of spatial gain coefficients to the multiple different channel signals to generate a perceivable direction and a perceivable spread that will be provided for the simulated reverberation sound signal. The embodiments apply a set of decay rate coefficients to the multiple different channel signals to generate a blended effect that will be provided for the simulated reverberation sound signal. The embodiments use a feedback loop to generate a truncated reverberation sound segment. The feedback loop generates the truncated reverberation sound segment by repeatedly convolving the truncated reverberation sound segment with itself multiple times and by causing each repeated version of the truncated reverberation sound segment to decay over time. The embodiments convolve the truncated reverberation sound segment with the sound signal and with the multiple different channel signals to create a playable sound signal comprising the reverberation effect for the sound.

Some embodiments simulate multi-emitter spatial reverberation. For instance, such embodiments obtain one or more impulse responses associated with one or more audio signals. These embodiments partition the impulse response into a plurality of impulse response partitions. Each of these impulse response partitions is associated with a respective time segment, decay time, and looping time. The embodiments loop these impulse response partitions while recursively applying a respective feedback filter for each impulse response partition. Furthermore, each respective feedback filter is based at least upon the respective decay time and looping time of its corresponding impulse response partition.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field of audio signal processing. In particular, the disclosed principles relate to various techniques for alleviating a computational bottleneck associated with rendering reverberation. The embodiments beneficially provide a scalable, multi-channel, and multi-emitter reverberation component that has a fixed runtime cost and minimal per-source (aka "emitter") computation requirements.

The embodiments also beneficially solve a so-called "whooshing" problem by keeping loudspeakers head-locked. Improvements in speed and efficiency are also achieved. For instance, the embodiments can achieve a 2× increase in computational speed while still providing maximum quality. These improvements in speed can be achieved by slimming down filter lengths and counts. The embodiments can also easily support new loudspeaker configurations based on differences in design constraints. Echo density is also now correctly distributed over the sound sphere.

Yet another benefit relates to a switch from a best/good quality selection to specific channel-count configurations. Now, sound designers have the option to choose the layout that works best for them in terms of cost or output parameters.

The embodiments also beneficially support a number of different output channel counts. For instance, the following counts are supported by the disclosed embodiments: Mono (1); Stereo (2); Quad (4); Cube (8); and even Icosahedron (12). The embodiments can use anywhere between 1 and (X) internal channels to process the above configurations based on a desired quality level. The embodiments also provide the option to select different quality levels, which allows for scaling the number of spatial buffers or the number of decay approximation buffers (or both).

Also, instead of generating the impulse responses (IRs) at runtime, the embodiments beneficially load all IR data from precomputed tables. Doing so increases binary size but it dramatically speeds up initialization. Additionally, the embodiments can use constant static pointers for all static data in order to avoid certain other costs (e.g., costs associated with wave works interactive sound engine (WWISE) cutting off the plugin when the voice count is zero).

This disclosure also describes a so-called "T60" or "RT60" parameter, which refers to the amount of time that a reverberation can no longer be heard by a listener. A T60 of 1 second means that after 1 second, the reverberation sound can no longer be heard by the listener. In this regard, then, the T60 time can be considered as being the reverberant length for a sound. The T60 can change periodically or even continuously for all sources. Thus, the embodiments are beneficially able to determine the T60 for each source at any given moment, and this computation can be performed in real time. The T60 computation will also depend on where the source is located as well as where the listener is located. Thus, every source comes with its own T60 requirements and information. The fact that the embodiments are able to operate using a unique T60 for each source is also unique over traditional reverberation techniques. Traditional reverberation techniques required the T60 factor to be a setting on globally applicable reverberation filters (each of which is computationally expensive, as previously noted), and any sound that came in was assigned the same T60. Thus, the embodiments are able to achieve a per sound source property of T60, and the embodiments achieve that benefit without exploding the costs in terms of computation. Accordingly, these and numerous other benefits will now be described in more detail throughout the remaining sections of this disclosure.

Sound Playback with an MR System

Attention will now be directed to FIG. 1, which illustrates an example MR system in the form of a head mounted device (HMD) 100A and 100B. HMD 100B is shown as including a display 105 as well as a number of speakers, such as speaker 110 and speaker 115. The display 105 is used to visualize a hologram (aka "source"), and the speakers 110 and 115 are used to playback sound associated with that source.

Figure 2:
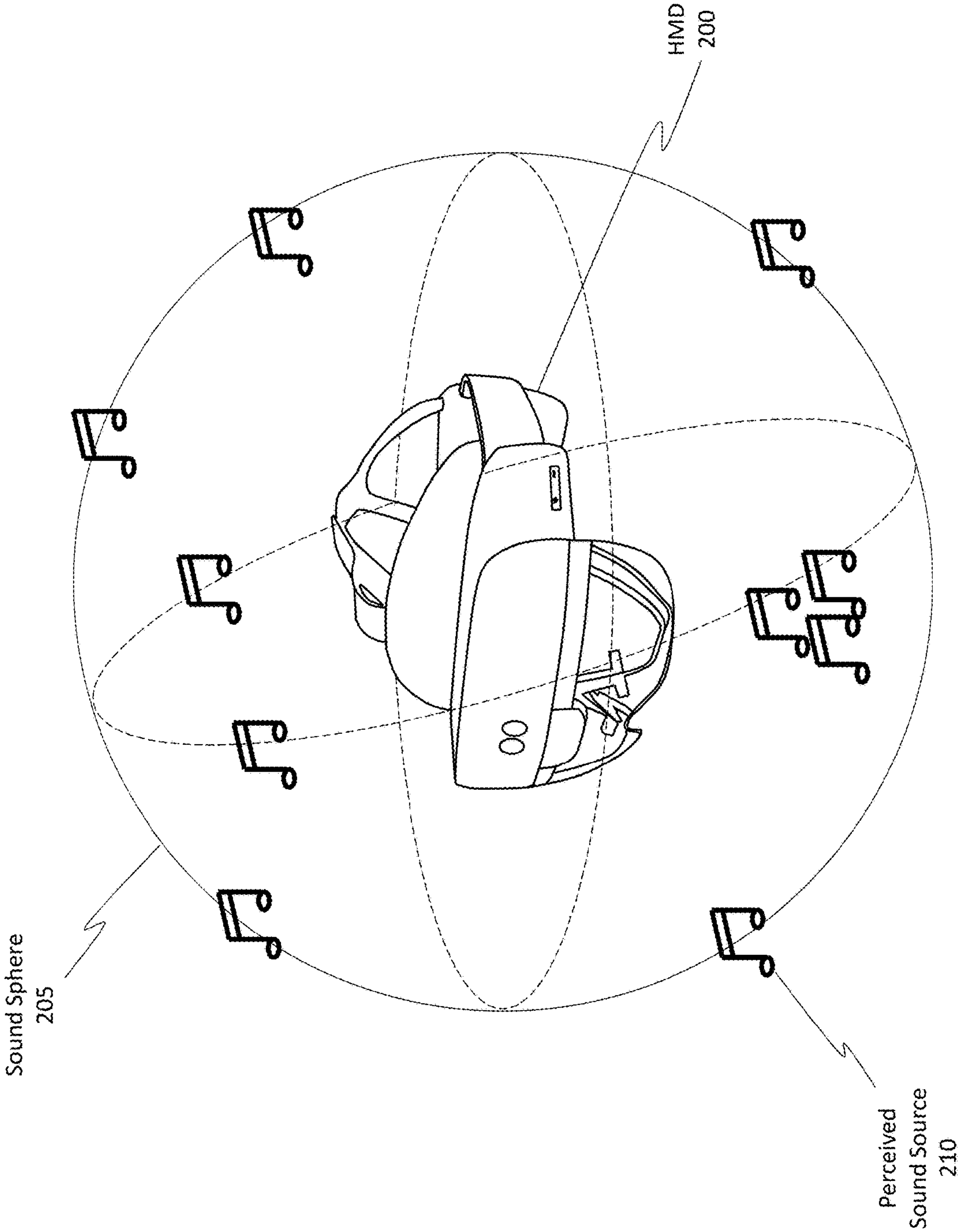
FIG. 2 illustrates an example of a sound sphere around an HMD.

FIG. 2 shows an HMD 200, which is representative of the HMD 100A or 100B of FIG. 1. Using the speakers on the HMD 200, the HMD 200 can generate a so-called sound sphere 205, which generally relates to an omnidirectional sphere around the HMD where sound can seemingly originate.

For instance, suppose a hologram is displayed in the display at a position in front of the HMD 200 and at a position slightly lower than the HMD 200. The HMD 200 can render a sound and can playback that sound using its speakers. Notably, the manner in which the sound is played can have the illusion as if the sound originated at the position of the hologram even though the sound is actually emanating from the HMD's speakers. With reference to FIG. 2, the perceived sound source 210 is the location where the sound is perceived as originating even though the sound is actually emanating from the HMD's speakers.

The spherical soundfield or sound sphere 205 can be represented as a layout of "I" virtual loudspeakers. The directions of the loudspeakers can be regularly spaced around the sphere, either as horizontal rings, platonic solids, or by utilizing spherical T-designs.

Figure 3:
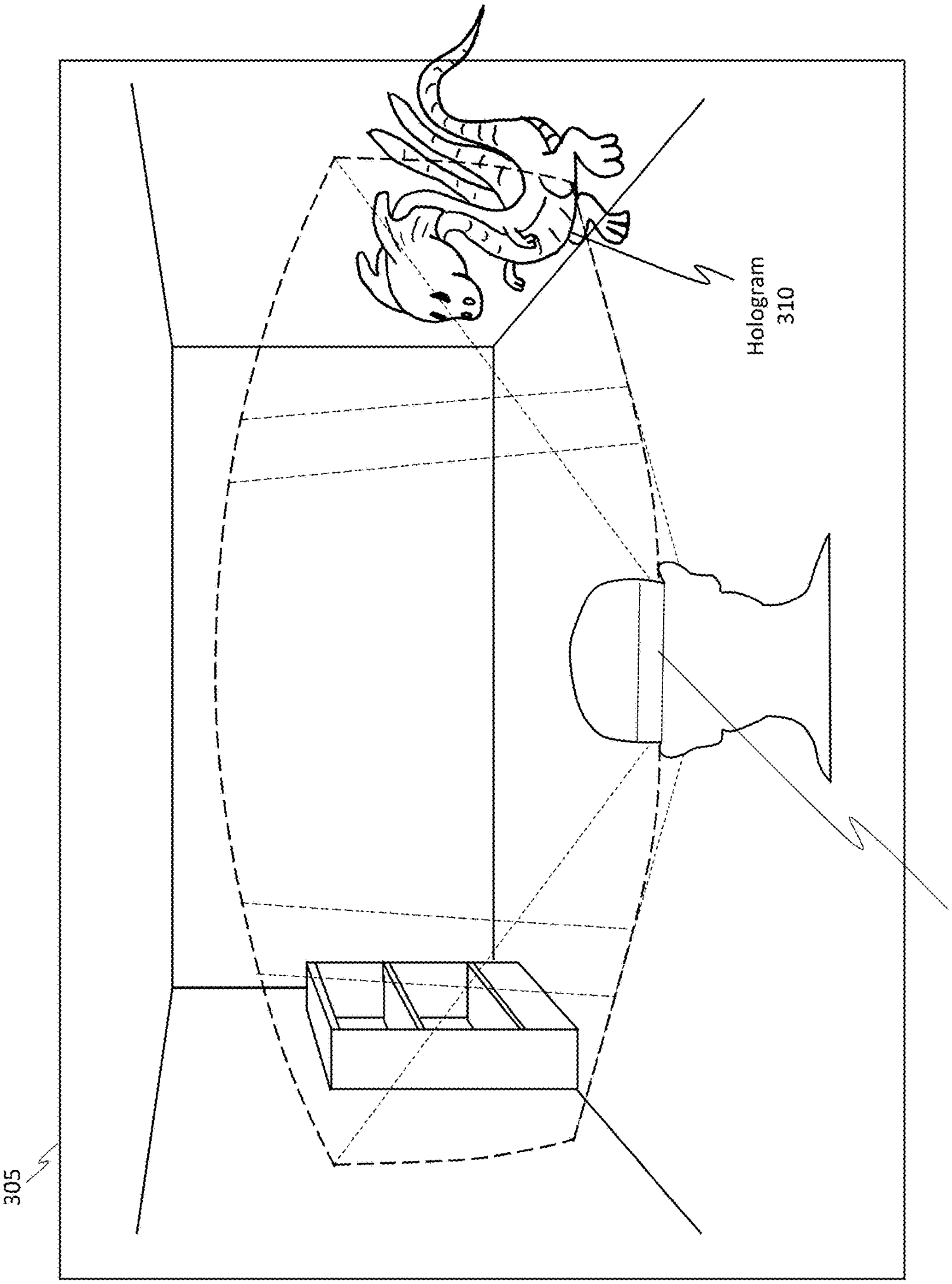
FIG. 3 illustrates an MR scene that includes a hologram, which is a source for a sound.
Figure 4:
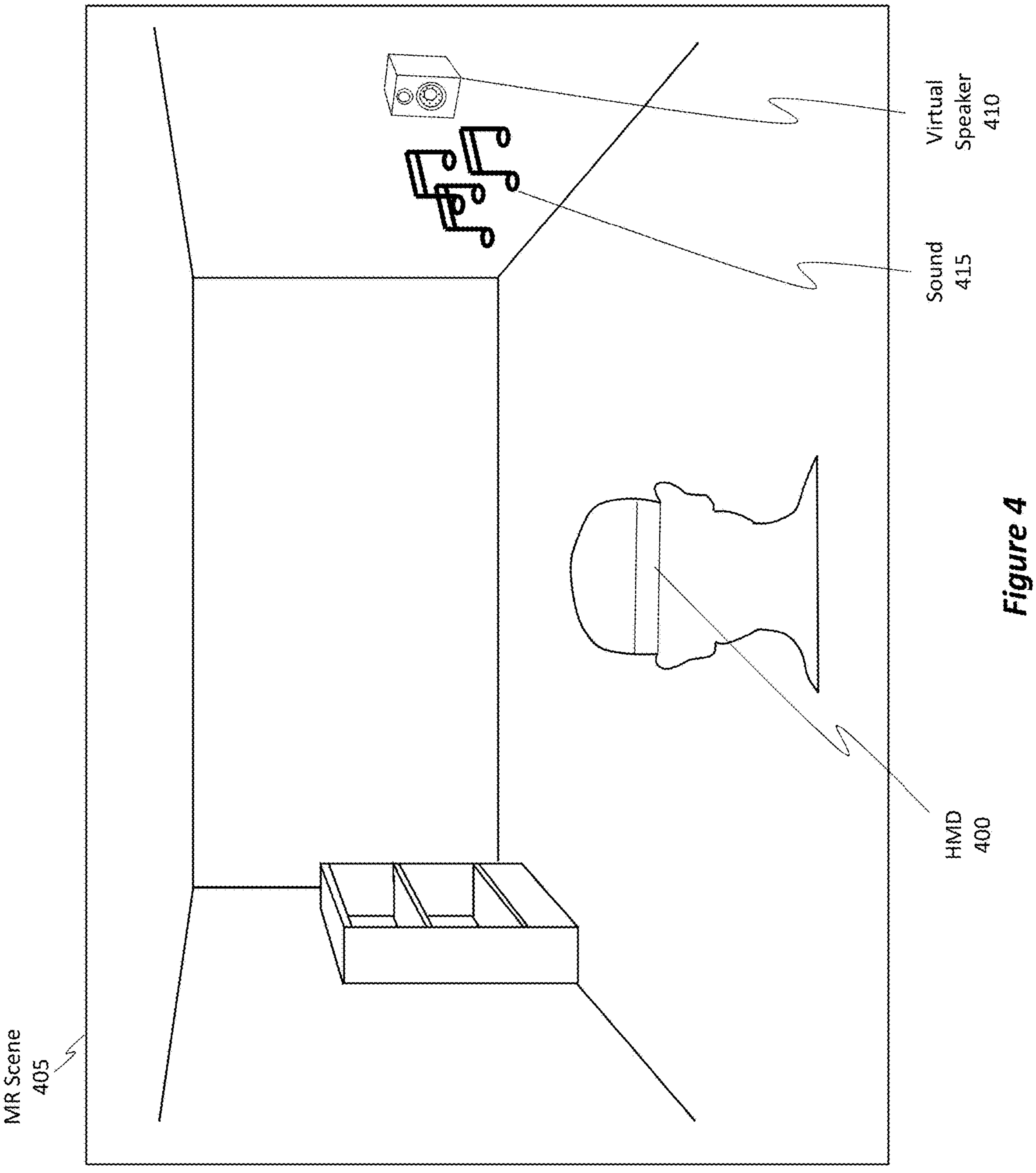
FIG. 4 illustrates a virtual speaker playing a sound.

The HMD 200 is able to playback a sound in a manner to give the illusion that the sound originated at any location on the sound sphere 205. FIGS. 3 and 4 provide another example.

FIG. 3 shows an example HMD 300, which is representative of the HMDs mentioned thus far. HMD 300 is displaying an MR scene 305 in its display. MR scene 305 can be a VR scene or an AR scene. The MR scene 305 is shown as including a hologram 310 displayed at a particular position in the MR scene 305. This position is in front and to the right of the HMD 300.

FIG. 4 again shows an HMD 400 and an MR scene 405, which are representative of the HMD 300 and MR scene 305, respectively, in FIG. 3. In FIG. 4, the HMD 400 is playing a sound in a manner as if the sound is originating at the location of the hologram 310, or, in other words, as if the sound is coming from the hologram 310. For instance, a virtual speaker 410 is shown as playing a sound 415, where the virtual speaker 410 is shown as being located at a position in front and to the right of the HMD 400 (corresponding to the position of the hologram 310). Even though the sound is actually emanating from the HMD's speakers, the embodiments are able to create a so-called "virtual" speaker that seemingly exists at the location of the hologram.

Figure 5:
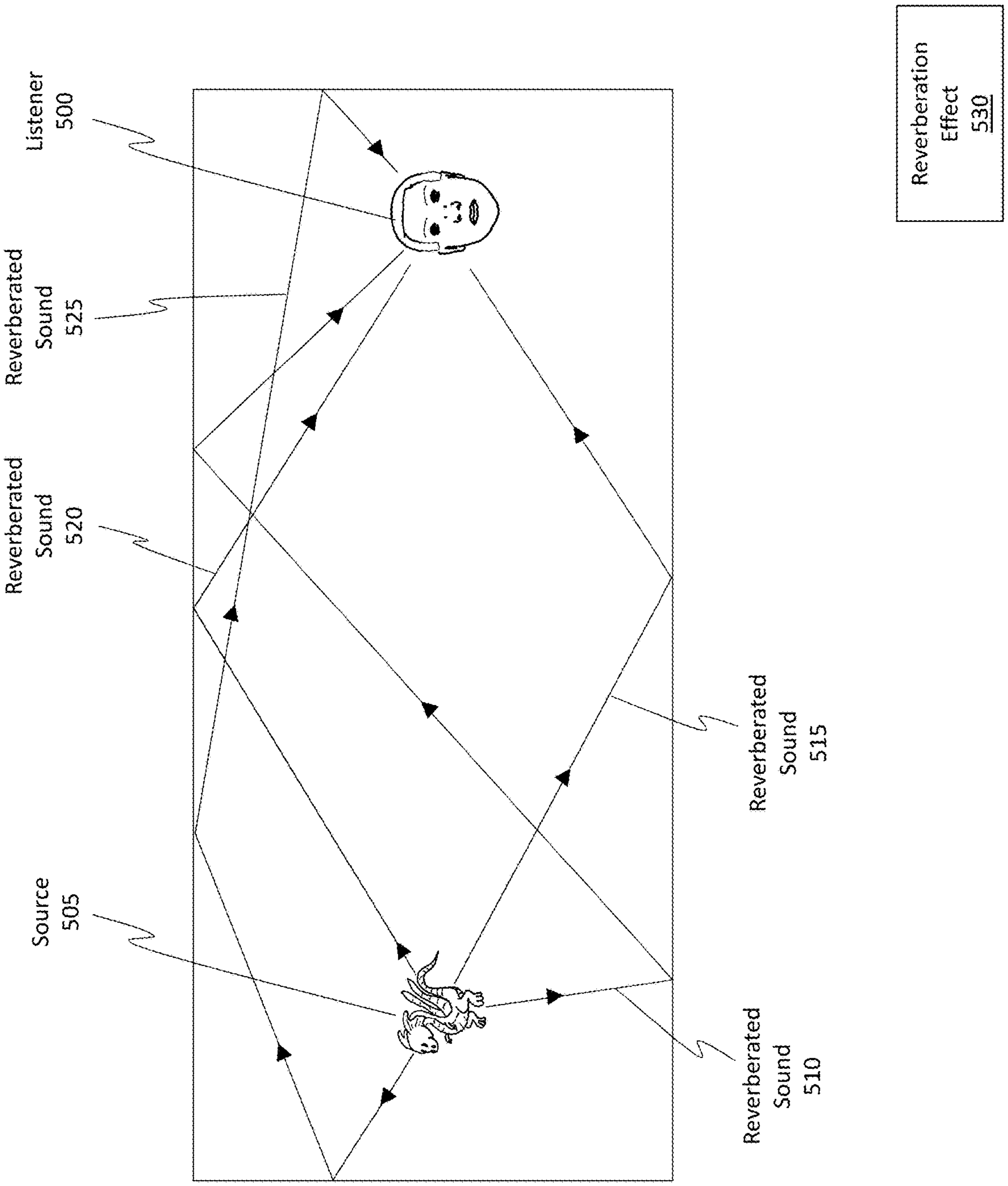
FIG. 5 illustrates a reverberation effect.

In addition to playing any type of sound, the embodiments are also able to render and play a reverberation effect for that sound. As mentioned previously, the term "reverberation" refers to the prolongation of a particular sound or to the continued effect or repercussion that is associated when a sound occurs. FIG. 5 provides some additional clarification.

FIG. 5 shows a listener 500, who is a person that will be wearing the HMDs mentioned earlier. Also shown is a source 505, which refers to a hologram that is associated with a sound. The HMD is able to render and play a sound as if the sound originated at the location where the source 505 is. In addition to that initial sound, the HMD is able to render and play a reverberation effect for that sound. For instance, if the source 505 were to clap, a clapping sound can be played as well as a clapping reverberation sound.

FIG. 5 generally shows the spread that can occur with reverberation. This reverberation effect includes any number of additional sounds that act as a prolongation for the initial sound. These additional sounds are illustrated as reverberated sound 510, reverberated sound 515, reverberated sound 520, and reverberated sound 525. An example regarding "spread" will be helpful.

Suppose a user wearing an HMD is in a first room and a hologram is rendered in a second room. A door is closed between the first room and the second room. In this example scenario, the reverberation will seemingly appear as being tightly focused or stemming from the single location of the door. Thus, in this case, the spread is very minimal and the direction of the sound is coming from the door. Stated differently, the T60 direction will thus seemingly originate from the door.

In a second example, suppose both the user and the hologram are in the same room, and the room is large. In this example scenario, the reverberation will seemingly appear as coming from an expansive area. Thus, in this case, the spread is very large. In this case, the T60 direction will thus seemingly originate from the location of the hologram in the room. The disclosed embodiments are able to specify a T60 direction and spread on a per sound source basis, which is a concept that is entirely unique over traditional reverberation techniques. The reverberation effect 530 shown in FIG. 5 thus generally represents any number of sound signals that represent a reverberation for a sound.

Example Architecture

Figure 6:
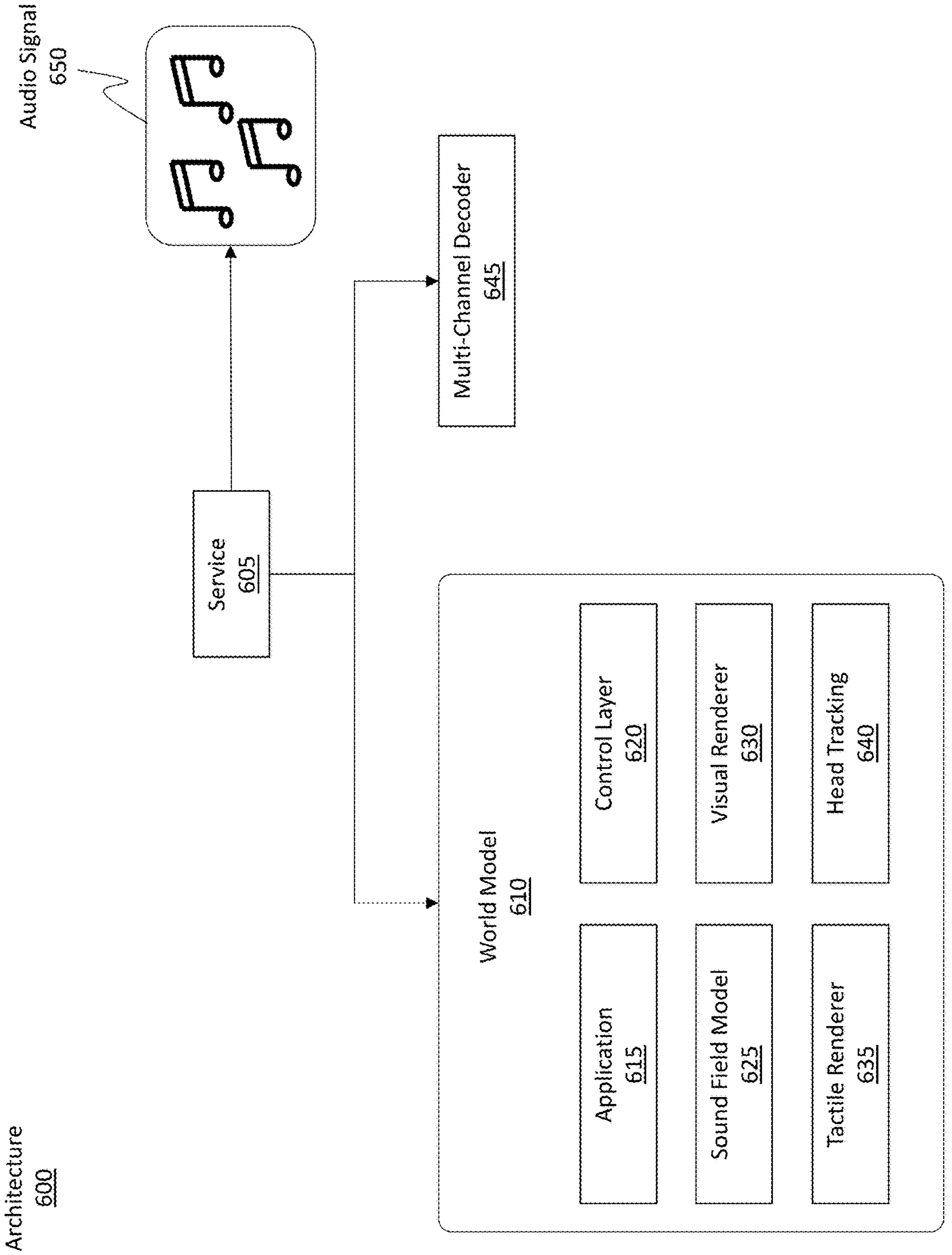
FIG. 6 illustrates an example architecture for generating a reverberation effect.

Attention will now be directed to FIG. 6, which illustrates an example architecture 600 that can be implemented using the disclosed HMDs mentioned earlier and/or which can be implemented in a cloud environment. Architecture 600 is shown as including a service 605. As used herein, the term "service" refers to a program or programming construct that is tasked with performing various different actions based on a given set of input. In some cases, the service 605 can be a deterministic service capable of performing complete operations based on the input and without a randomization factor. In some cases, service 605 may employ machine learning (ML) or artificial intelligence, which is capable of responding when faced with a randomization factor.

Service 605 can be a local service operating on the HMD. In some cases, service 605 can be a cloud service operating in a cloud environment. In some cases, service 605 can be a hybrid service that includes a local component on the HMD and a cloud component in the cloud environment.

Service 605 is generally tasked with generating and managing a world model 610 for the MR system. The world model 610 includes an application 615, such as perhaps a work application, a gaming application, an instructional application, and so on. The application 615 is generally an application that is able to provide data to a user and to receive input from the user.

The world model 610 further includes a control layer 620, which operates to receive and manage the input from the user. The input can be verbal, physical, or any other type of input. Often, the application 615 displays data and/or holograms to a user. It is often the case that these holograms have sound associated with them. As a result, the world model 610 further includes a sound field model 625 that enables the service 605 to determine how to render and playback sound for the holograms. The visual renderer 630 is a component that determines where, when, and how to render and display holograms or other content. The tactile renderer 635 is a component that can provide a tactile response when the user provides input or when a hologram is performing an action or for any other action associated with the application 615. Finally, the head tracking 640 is a component that tracks the position of the user's head, where that position corresponds to the position of the HMD.

Service 605 is shown as also including or at least utilizing a multi-channel decoder 645. This multi-channel decoder 645 is structured to determine how to render and playback a reverberation effect for sound generated by the HMD and the service 605. The result of producing the reverberation effect is an audio signal 650 that can be played over the HMD's speakers.

Multi-Channel Decoder

Figure 7:
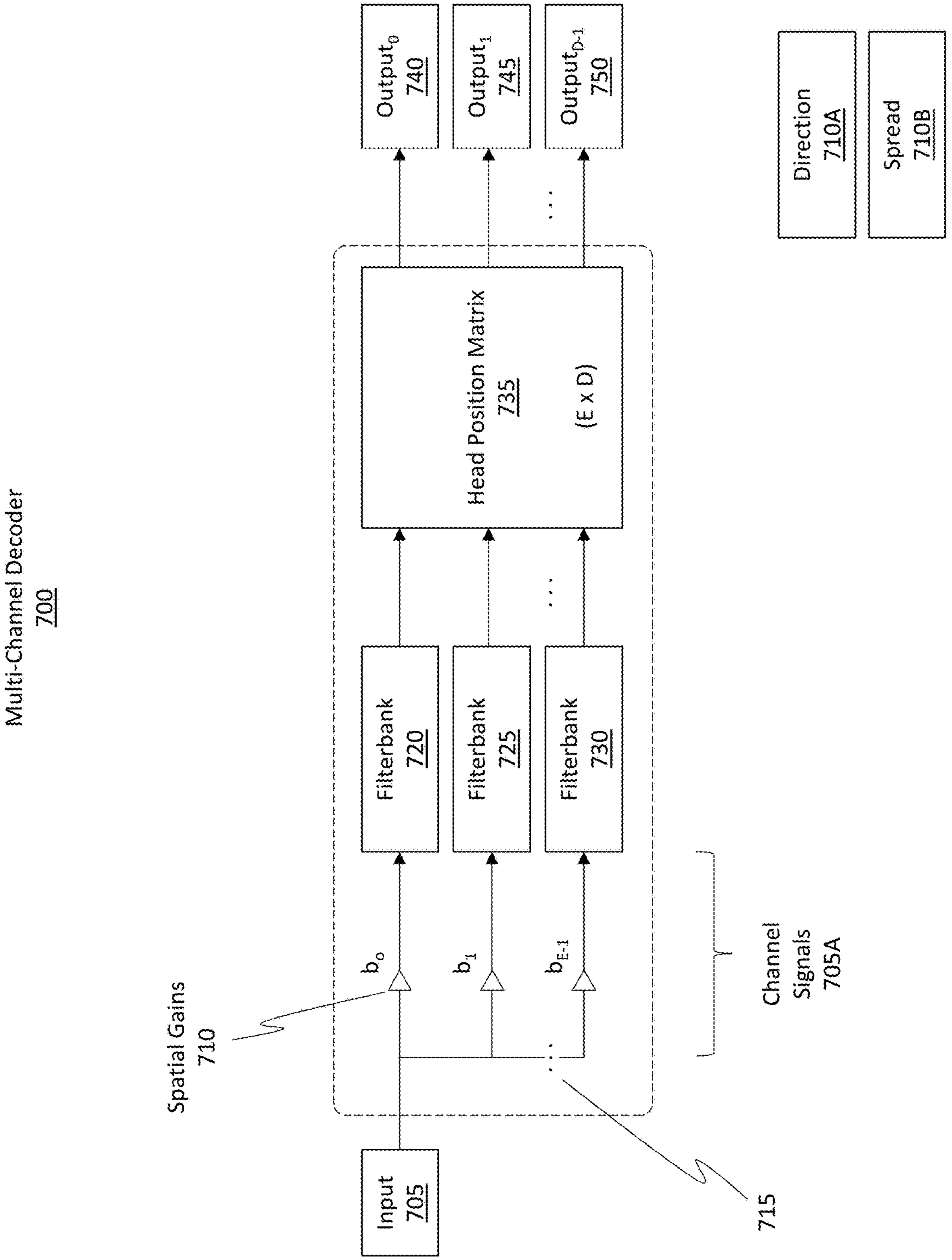
FIG. 7 illustrates an example of a multi-channel decoder used to generate the reverberation effect.
Figure 8:
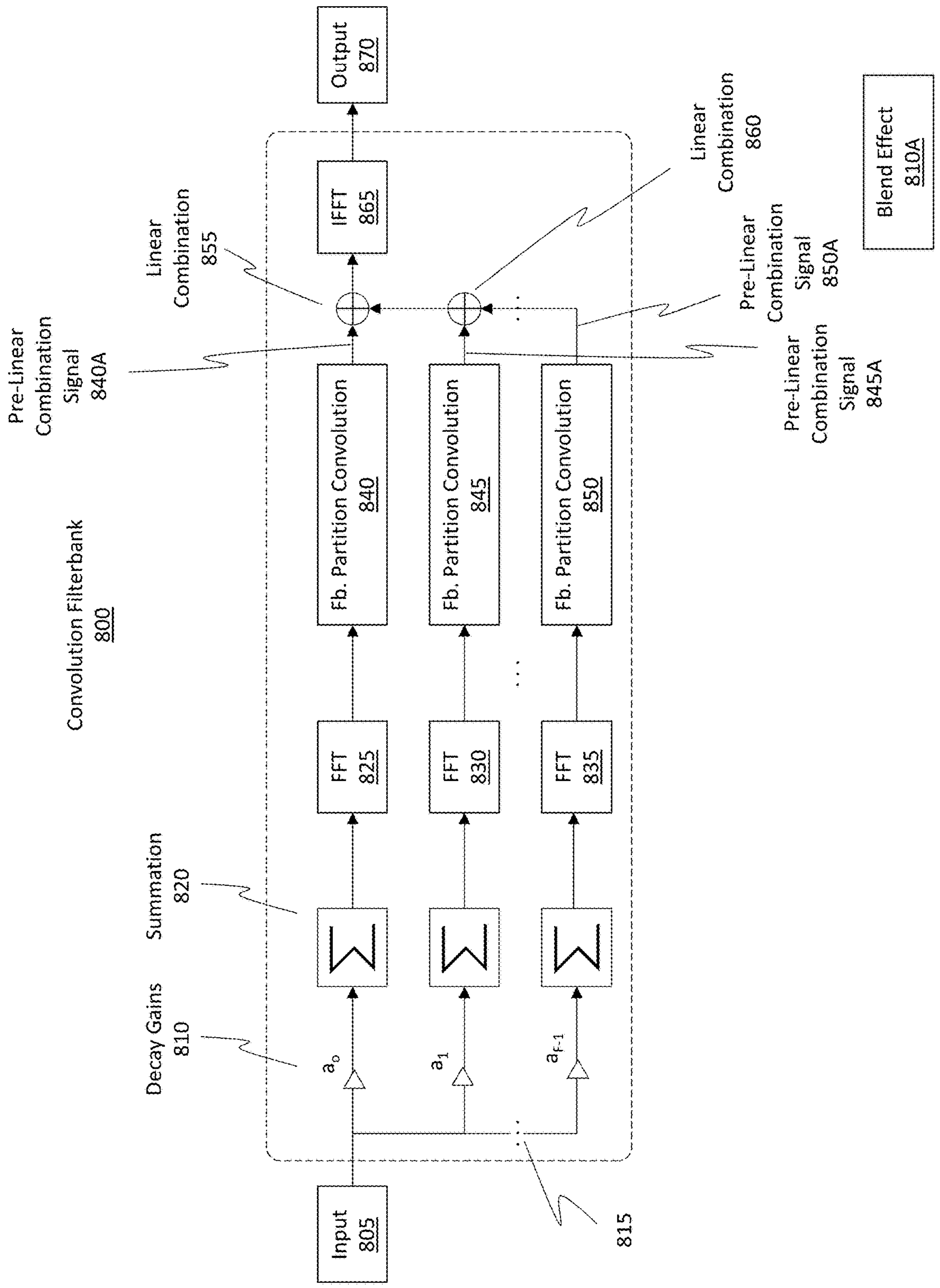
FIG. 8 illustrates a convolution filterbank.
Figure 9:
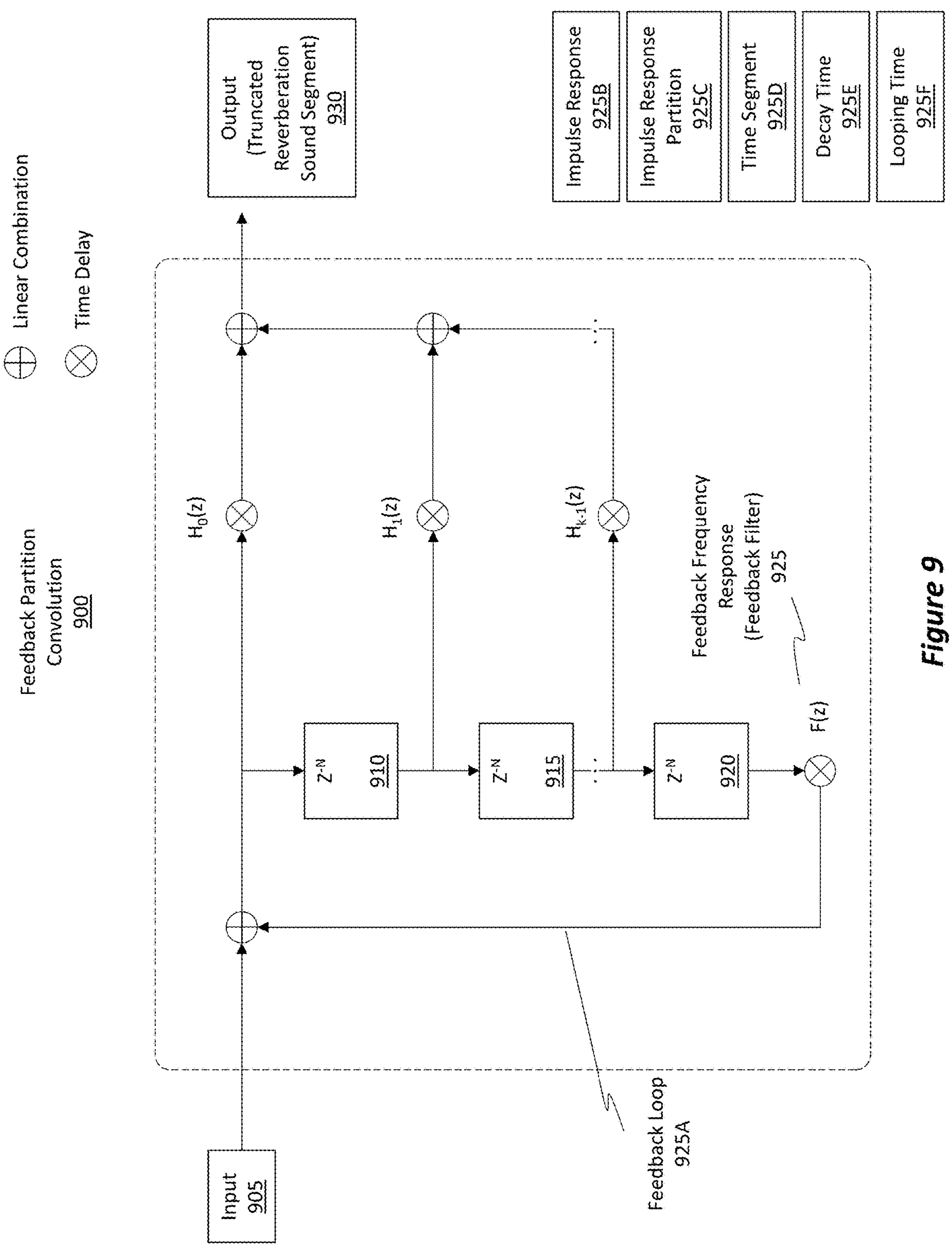
FIG. 9 illustrates a feedback partition convolution filter.

FIGS. 7, 8, and 9 will now discuss in detail the architectural aspects of the multi-channel decoder 645 of FIG. 6. After this description on the structure, a discussion on the behavior and operations of the multi-channel decoder will be provided. The multi-channel decoder 645 is a component that is able to provide a reverberation effect for holograms displayed in an MR scene, and the reverberation effect can travel through different spaces to match the movement of the hologram. Ideally, the reverberation is created in a manner so that the sound for the sources (i.e. holograms) is played as if the sound originated in the space where the hologram is located.

To do that reverberation directly is prohibitively expensive, as discussed earlier (e.g., requiring a per-source convolution and the generation of a unique impulse response for each source convolved with the other sources). What is presented here relates to a decoder that is able to mix reverberation effects for different sources together into a fixed system so that the resulting reverberations can appear as a linear aggregate that approximates actual reverberations. The original sound (e.g., an initial clapping sound) need not be pre-processed in order to generate the reverberation effect for that original sound. As a result, reverberation effects can be provided for sounds that are generated in real-time, and those reverberation effects can be created in a less expensive manner (e.g., in terms of sourcing costs, memory, processor usage, processor cache contention, and so on). The result is a reverberation effect that achieves the same approximate decay time and the same approximate place or spatial location for the sound using a less compute intensive aggregation technique as compared to traditional techniques. This reverberation effect is also achieved using a fixed cost, is highly scalable, and can be driven much less expensively than direct techniques.

The multi-channel decoder is able to render a set of sounds that can be played by so-called "virtual speakers" that are positioned around the user's head. In actuality, the virtual speakers do not exist; rather, a set of actual speakers play the rendered sound, but the sound is played back in a manner as if it were being played by a virtual speaker located at a position corresponding to the source of the sound (e.g., the hologram). As will be discussed in more detail shortly, the embodiments are able to blend the various different reverberation effects for the holograms using an approximation operation performed in terms of space (e.g., using different spatial gains) and using an approximation operation performed in terms of decay time (e.g., direction and spread). For each spatial position, there is a set of filters that are used to provide the spatial approximation. Similarly, a set of decay filters can be used to approximate a given decay. As a result, a matrix of filters are used, where the filters are for space and time and where the filters are able to approximate any spatial configuration and any decay time for every source via the disclosed mixing process (e.g., a linear combination).

FIG. 7 shows a multi-channel decoder 700 that is able to receive input 705 corresponding to a source (e.g., a hologram) and generate audio signal output that can be played back by a number of speakers on the HMD. The input 705 is distributed across multiple different channel signals 705A. At a high level, the embodiments apply a set of spatial gain weights to an input and then feed the resulting signals into an array of buffers. The signals are then summed together to reconstruct a given decay time that has a given shape on a sound sphere. Notably, all of the inputs for the sources are combined together in the set of buffers represented by the filterbanks in FIG. 7, where the combination is represented internally within those buffers by the linear combinations 855 and 860 in FIG. 8, and where that combination is performed in a simultaneous manner. The processing that is performed after the summation boxes (e.g., summation 820) shown in FIG. 8 are then fixed compute operations. The processing that is performed prior to the summation boxes in FIG. 8 is per source compute operations. Stated differently, the processes performed up to the summations are performed per each source.

To illustrate, FIG. 7 shows a set of spatial gains 710 denoted by the letter "b" and a subscript. These coefficients can also be referred to as the "channel input gains." The term "E" refers to the total number of encoded channels (i.e. the channel signals 705A), and the term "D" refers to the total number of decoded outputs. The ellipsis 715 illustrates how any number of spatial gains and channel signals can be included in their respective sets. Each channel signal, then, can be considered as being a combination of audio inputs that can be treated as originating from a direction corresponding to a source's location.

The spatial gains 710 are used to approximate a spatial position as to where the reverberation effect is to occur in the MR scene. In effect, the "b" coefficients (i.e. the spatial gains 710) approximate the sound shape that would occur on the sound sphere 205 shown in FIG. 2, where the "shape" generally refers to the location or arrival direction where the sound arrives from as well as the spread. For instance, the spatial gains 710 are used to generate a perceivable direction 710A and a perceivable spread 710B for a simulated reverberation sound signal. Further clarification regarding how the "b" coefficients (e.g., the spatial gains 710) provide the spread for the reverberation effect will be provided later.

The spatial gains 710 provide the decoder the shape (e.g., arrival direction and spread) for the reverberation sound. The contribution of the spatial gains 710 approximate the given shape of the reverberation sound. Each input or channel signal goes into a corresponding set of accumulating buffers (e.g., the filterbanks). Further, each input is associated with a corresponding set of weights, where those weights (i.e. the "b" coefficients) approximate both the shape on the sphere and the decay time as well as any other reverberant properties (e.g., echo density). By way of additional clarity, a set of "b" coefficients are available for each incoming input. Those "b" coefficients can be fed to the multi-channel decoder 700 to facilitate the determination of the spread and direction for the reverberation effect. Thus, the logic for the multi-channel decoder 700 can remain unchanged, but the multi-channel decoder 700 can be used to generate any type of reverberation effect by using different versions of the "b" coefficients.

Regarding the "b" gains, it is possible to apply separate gains ($b_i$) to the input feeds of the buffers (e.g., the filterbanks), thereby dynamically generating the so-called "virtual loudspeaker(s)" that seemingly exist at the location where the reverberation effect occurs. Also, the process of applying the separate gains to the input feeds operates to adjust the spatial image. These gains are computed via a normalized spherical gaussian function:

$$b_i = \frac{e^{\lambda_{\theta_s}[(x_s \cdot x_i)-1]}}{\sqrt{\sum_{i=0}^{I-1}\left|e^{\lambda_{\theta_s}[(x_s \cdot x_i)-1]}\right|^2}} \tag{1}$$

Where $\lambda_{\theta_s}$ is the coefficient that sufficiently satisfies:

$$G\left(e^{\lambda_{\theta_s}(x_s \cdot x_i)}\right) \approx G(c_i) \tag{2}$$

Where $c_i$ are the gains (over a reasonably dense loudspeaker layout) for a hard-edge cone of angle $\theta_s$.

$$c\_i = \begin{cases} 1, & \text{if } x_i \cdot x_s \geq \cos\theta_s/2 \\ 0, & \text{otherwise} \end{cases} \tag{3}$$

And $G(b_i)$ is the Gerzon energy vector:

$$G(b_i) = \frac{\sum_{i=0}^{I-1} x_i |b_i|^2}{\sum_{i=0}^{I-1} |b_i|^2} \tag{4}$$

Wider, more omnidirectional signals will have nearly-equal gain in all loudspeakers, while sharper, more directional signals will have nearly all gain localized in one or two loudspeakers. Note how the above description stated $\lambda_{\theta_s}$ must merely sufficiently satisfy (2). For a given set of I directions, it can be shown that:

$$\theta_S \propto \frac{1}{\left|G\left(e^{\lambda_{\theta_S}(x_S + x_i)}\right) - G(c_i)\right|^2} \tag{5}$$

It is possible to specify a maximum tolerance to this error, both with respect to distance vectors and their inner product and to use this as a cut-off point to limit minimum spread angles to avoid spatial aliasing.

After applying the spatial gains 710 to the input 705, the resulting signals are fed into a set of filterbanks, as shown by filterbanks 720, 725, and 730. FIG. 8 shows a convolution Filterbank 800 that is representative of any one of the filterbanks 720, 725, and 730.

The filterbank 800 receives input 805, which is representative of any of the inputs being fed into any of the filterbanks 720, 725, or 730 from FIG. 7. FIG. 8 shows a set of decay gains 810 denoted by the letter "a" and a subscript. The coefficients can also be called the "filter input gains." The "F" subscript term refers to the total number of filters in the filterbank. The ellipsis 815 illustrates how any number of decay gains can be included in this set. The decay gains 810 are used to approximate a decay time for the reverberation effect at a given direction.

The "a" coefficients thus correspond to accumulating buffers that will be fed into decay filters, where the decay times increase as the subscript on the "a" coefficients increase. In effect (as will be described in more detail shortly), the "a" coefficients provide the system with the desired T60, and the "b" coefficients provide the system with the desired direction and spread. Furthermore, application of the decay gains 810 results in a blend effect 810A that will be provided for the simulated reverberation sound signal. The "a" and "b" coefficients can be obtained from the metadata of the input 705 of FIG. 7, as will be further explained below.

Regarding the decay gains (the "a" coefficients), for each incoming source, the embodiments approximate that source's given decay time $T_s$ by linear combination of a set of J exponentially decaying basis filters. Each source has a known, distinct decay time and an arrival direction, and the embodiments perform the disclosed operations in an attempt to approximate that distinct decay time, where the approximation is performed using the "a" coefficients. Stated differently, each input, along with each input's corresponding set of coefficients, is fed into a corresponding set of accumulating buffers (e.g., the filterbanks). Those coefficients (aka weights) approximate both the shape on the sound sphere as well as the decay time. As a result, the embodiments feed input and weights into an array of buffers; the embodiments sum the resulting signals together; and the embodiments then reconstruct a given decay time with a given shape on the sound sphere. The decay basis filters (i.e. the "a" coefficients) can be ordered from shortest to longest decay time ($T_{j+1}>T_j$). To determine the gains ($\alpha_j$) for each source, it is possible to first select the pair of consecutive basis filters ($*_j$ and $*_{j+1}$) where:

$$T_{j+1} \geq T_S \geq T_j \tag{6}$$

The embodiments can combine two exponentials so that when blended, they exactly intersect at the RT30 dB timepoint (i.e. halfway) along the desired $T_s$:

$$a_j = \frac{\log\left(10^{-60/20}\right) - e^{\gamma/T_{j+1}}}{e^{\gamma/T_j} - e^{\gamma/T_{j+1}}} \tag{7}$$

$$a_{j+1} = 1 - a_j \tag{8}$$

where $$\gamma = \log\left(10^{-60/20}\right)\frac{-30}{-60}T_S \tag{9}$$

This works well for desired decay times between 0.25 s and 3 s. Stop values for a J=3 and J=4 basis filter sets were determined by minimizing the error between the expected decay time $T_s$ and the actual decay time of the blended result via linear regression. It was also found that the three-element basis filter set is suitable for most rendering cases, and the four-element set is best for precise T60 approximation.

After the decay gains 810 are applied to the input 805, the signals for the different inputs are summed together, as shown by summation 820 (i.e. these modules accumulate encoded input buffers) performed per input/source. The processes downstream of the summations are then fixed compute processes whereas the processes upstream of the summations were per-source computations.

An FFT is then applied to the output of each respective summation operation, as shown by FFT 825, 830, and 835. Prior to the summation operations, the decoder operations were performed for each source. Subsequent to the summation operations, the decoder operates using a fixed convolution process performed on the channel signals, as shown by the feedback (Fb.) partition convolution 840, 845, and 850. That is, the input provided to the FFT modules can be viewed as being a combination of various portions of multiple input channels (e.g., specifically, summing of potentially multiple input signals, such as one input signal from a plurality of the input channels).

FIG. 9 shows a feedback partition convolution 900, which is representative of any of the Fb. partition convolutions 840, 845, or 850 of FIG. 8. The feedback partition convolution 900 is the component that produces the reverberance having a particular decay path or decay response over some rate. Further details on the operations of FIG. 9 will be provided shortly.

Returning to FIG. 8, after the convolutions are performed, the output of the Fb. partition convolutions 840, 845, and 850, as shown by pre-linear combination signals 840A, 845A, and 850A, are linearly combined with one another, as shown by linear combination 855 and 860. Each signal (e.g., pre-linear combination signals 840A, 845A, and 850A) now has a different decay time. As an example, a first signal (e.g., perhaps pre-linear combination signal 840A) might have a decay time of 0.25 seconds; a second signal (e.g., perhaps pre-linear combination signal 845A) might have a decay time of 1.5 seconds; and a third signal (e.g., perhaps pre-linear combination signal 850A) might have a decay time of 3.0 seconds. In another scenario, the decays times can be the following: 0.25 s, 0.69 s, 1.36 s, 1.54 s, and 3.0 s.

The weights are mixed between those signals to achieve a desired decay time (e.g., in this example case, perhaps 1 second decay time) for the output 870 as a whole. Those signals (e.g., pre-linear combination signals 840A, 845A, and 850A) are summed together to achieve the desired decay time. An IFFT is then performed on the resulting combined signal (e.g., the signal that is generated as a result of combining pre-linear combination signals 840A, 845A, and 850A), as shown by IFFT 865 to create an output 870.

The output 870 refers to any of the outputs of filterbanks 720, 725, or 730 in FIG. 7. In FIG. 7, the outputs of these filterbanks correspond to spatial channels, which can then be rotated using the head position matrix 735 based on the orientation of the listener and based on where the output channels are located. The head position matrix 735 is of size E×D, and the multiplication is an E×D matrix multiplication operation.

By way of further detail, those outputs are then mixed together using a head position matrix 735, which describes the position of the user's head in space. The result of applying the head position matrix 735 is a set of outputs, as shown by outputs 740, 745, and 750. Output 740 will be played by a first speaker; output 745 will be played by a second speaker; and output 750 will be played by a third speaker. The user wearing the HMD will hear the resulting reverberation effect, and that reverberation effect will sound as if it were being played by a virtual speaker located at the position where the hologram is located. Thus, prior to application of the head position matrix 735, the embodiments factor in the location of the user within a given room. Application of the head position matrix 735 enables the embodiments to account for the rotation of the user's head at the known location of the user within the room. The head position matrix 735 also encodes the signal based on the speaker configuration of the HMD. Thus, prior to application of the head position matrix 735, the processes are abstracted relative to the device.

In this manner, the multi-channel decoder 700 can be viewed as including a number of different filters/buffers (e.g., the filterbanks 720, 725, and 730). Each filter is provided with weighting input (e.g., the coefficients) associated with a particular spread of T60 values and directionality. The embodiments are able to intelligently convolve or blend the outputs from the various different filters in order to achieve a specific T60 direction and spread. The embodiments do not just simply bin direction values to create the reverberation effect for a particular direction. Instead, the embodiments perform enhanced operations that utilize different blending weights that allow for an improved sound effect not only for a first reverberation effect for a first hologram but also for other reverberation effects for other holograms.

Simply binning to a nearest direction would result in a snapping or whooshing effect, but the embodiments are able to avoid that via the use of the blending weight coefficients. The embodiments beneficially provide various different unique aspects over traditional techniques, these aspects include (i) a unique filter design that reduces cost, (ii) an intelligent selection as to how many filters to use, and (iii)

an intelligent determination as to what blending weights or coefficients to use with those filters.

Turning back to FIG. 9, the feedback partition convolution 900 is a type of filter designed to loop back on itself in an efficient manner. This filter (i.e. the feedback partition convolution 900) in effect creates a "partitioned" or "truncated" segment of a decaying reverberance, which is then looped back on itself, as shown by the feedback loop 925A in FIG. 9. This feedback loop is beneficial because, instead of having to compute the entire length of a long decaying filter, the embodiments are able to use a much shorter segment and then repeat that segment, where the term "segment" refers to an audio signal having a defined length of time, which can be stored in logic. In terms of compute, the time needed to compute that shorter segment results in much less compute being spent as compared to the amount of compute needed to determine the entire length of a long decaying signal.

Stated differently, to generate a reverberation effect, the system is tasked with performing a convolution operation. The convolution can be thought of as the most basic or atomic piece of generating a reverberation effect. Traditionally, if a system desired to generate a reverberation effect for a clap sound that had a three second long reverberation, then that system would have to compute a 3 second long convolution to generate a decaying noise. The traditional system would have to convolve that 3 second long sound with the original clapping sound. Doing so would consume a significant amount of compute. The main idea presented in FIG. 9 is that the disclosed embodiments can actually repeat a simplified noise pattern at some periodic rate while still achieving the same reverberation effect.

In essence, FIG. 9 capitalizes on a perceptual trick in that listeners will typically not be able to discern a difference between a repeating noise pattern to create a reverberation effect and an actual, prolonged reverberation effect. The more signal time that is buffered by the filter (and thus can be repeated by the filter), the more compute the filter will save because of the feedback loop in the filter. Therefore, instead of having a long 3 second segment that is being convolved, the disclosed embodiments (e.g., using the filter shown in FIG. 9) is able to break up a sound signal into a much smaller, repeatable piece that is associated with a gain. The smaller signal can then be repeated with a diminishing gain to produce a reverberation effect for the original sound.

FIG. 9 shows an input 905, which is representative of any of the outputs from the FFTs 825, 830, or 835 in FIG. 8. The input 905 can be linearly combined with a feedback signal, if available. The input 905 is then delayed. For instance, there is a first delay 910, a second delay 915, and a third delay 920. The "N" superscript values refer to the number of samples per frame, and the "K" subscript terms refer to the total number of frames.

The delays impart a delay of the signal by one frame. FIG. 9 also shows a feedback frequency response 925 (e.g., a feedback filter). The output from that response is then looped back, as shown by feedback loop 925A. FIG. 9 also shows various H functions, which are the frequency response frames of the partitioned impulse response (e.g., impulse response 925B and impulse response partition 925C), as will be described in more detail shortly. Furthermore, each impulse response partition is associated with a respective time segment 925D, decay time 925E, and looping time 925F. The resulting signals are linearly combined to produce the output 930.

Regarding the feedback frequency response 925 (i.e. the F function), the computation of the F function is dependent on the decaying signal, the desired looping period, the decay rate, and even the desired error attenuation. Applying the F function allows the signal to feedback on itself and to taper off in a seamless manner in a repeating pattern.

Additional Details

The disclosed embodiments beneficially reduce the number of per-source computations and instead utilize a fixed-cost, runtime-static pipeline. At the top level, the algorithm does the following: (i) input sources are encoded into input buffers; (ii) feedback-enabled partition convolutions process those buffers; and (iii) the results are decoded into head-locked loudspeaker outputs. FIGS. 7, 8, and 9 generally describe the architectural modules that enable this functionality. The embodiments are able to pre-compute all gain tables, impulse response loop parameters (an impulse response is designed to be a short, repeating noise sequence that decays over time, and the loop parameters are used to determine the length of the impulse response and the number of times the impulse response repeats), and decode matrices offline and then load them at runtime.

Regarding the $H_k$ (z) frequency-response frames shown in FIG. 9, these frames are created by partitioning each filter's corresponding impulse response (IR) into consecutive time segments. These IRs are designed as short, repeating noise sequences that decay over time (i.e. looping IRs). Each looping IR can have its own decay time, T and looping time, $KN/f_s$, where $f_s$ is the sample rate (in Hz). The creation process of these looping IRs will be discussed shortly.

Regarding the F(z) feedback filter, each looping IR has a corresponding feedback filter that is applied recursively when looping the IR. It is defined as:

$$F(z) = \alpha(z)^K e^{ln\left(10^{-60/20}\right)^{KN}/f_S T} \tag{10}$$

where α(z) is the frequency-dependent air attenuation over N samples.

Regarding the "a" filter gains (e.g., shown in FIG. 8), each input source may have its own decay time, Ti. In each convolution bank, the embodiments approximate a desired decay time by interpolating between a sequential pair of decaying exponential functions with decay times $T_f$ and $T_{(f+1)}$. Their linear gains ($a_f$ and $a_{(f+1)}$) are computed as follows:

$$a_f = \frac{10^{\beta/20} - \sqrt{\lambda}^{T_{f+1}}}{\sqrt{\lambda}^{T_f} - \sqrt{\lambda}^{T_{f+1}}} \tag{11}$$

$$a_{f+1} = 1 - a_f \tag{12}$$

$$\lambda = e^{\beta T_i ln(10)/20} \tag{13}$$

$$T_f \le T_i \le T_{f+1} \tag{14}$$

Beta is typically set to T30, but it is generalized in these equations.

Also, β (in dB) is the target-vs-approximation intersect line, as will be discussed shortly. The embodiments can tabulate linear gains for values of Ti between 0.25- and 3-seconds, in 50-millisecond increments.

Regarding the "b" channel gains (e.g., shown in FIG. 7), similar to how filter gains are used to linearly combine decay times to approximate the input's decay time, the embodiments can use channel gains to linearly combine convolution banks to approximate the input's direction and spread. This set of E×1 gains (b) is defined as $$b = y_E^{-1} S_i y_i \quad (15)$$

Where $Y_E$ is the E×E spherical harmonic encoding matrix, $S_i$ is an E×E diagonal spread matrix for the given input spread, and $y_i$ are the E×1 spherical harmonics vector for the given input direction.

Regarding the M decode matrix (e.g., shown in FIG. 7), following the processing of the banks, the results are decoded into a head-locked speaker channel format. This decode matrix is defined as:

$$M = Y_D^{-1} R_L Y_E \quad (16)$$

Where $Y_D$ is the D×E matrix of spherical harmonics for the given speaker layout, and $R_L$ is the spherical harmonic rotation matrix that corresponds to the listener's orientation.

Generating Looping Impulse Responses

The embodiments can generate a sequence of velvet noise (i.e. a maximal smoothness for the characteristics of the noise). The embodiments generate pulse positions for P pulses, with echo density, p, to construct a $(Pf_s)$/p-length pulse train. Let the pulse offsets, $\delta_p$, be defined as:

$$\delta_p = \left\lfloor (p + r_p)\left({}^{f_s}/_{\rho} - 1\right) \right\rfloor \quad (17)$$

Where p is the pulse index and $r_p$ is the p-th element from a uniform (0 to 1) random number sequence of length P. Each pulse also has a random sign:

$$g_{sign} = \begin{cases} 1, \text{ if } q_p > 0.5 \\ -1, \text{ else} \end{cases} \quad (18)$$

where $q_p$ is p-th element from another uniform random number sequence, also of length P. The pulses decay exponentially to −60 dB over T seconds:

$$g_{decay} = e^{ln\left(10^{-60/20}\right)^{\delta_p} \Big/ f_s T} \quad (19)$$

and have air attenuation accounted for:

$$g_{air} = \alpha(z)^{\delta_p / N} \quad (20)$$

The Frequency Response of Each Pulse is:

$$H_p(z) = g_{air} * g_{decay} * g_{\text{sign}} * z^{-\delta_p} \quad (21)$$

The embodiments can then define the frequency-response of a P-length velvet noise sequence as:

$$H(z) = \sum_{p=0}^{P-1} H_p(z) \quad (22)$$

The embodiments then spatialize each of the pulses with its own arrival direction, $x_p$, chosen uniformly over the sound sphere to produce a multi-channel, spatially-encoded impulse response:

$$H_E(z) = \sum_{p=0}^{P-1} Y_E^{-1} S_{min} y_p H_p(z) \quad (23)$$

where $y_p$ is $x_p$'s spherical harmonic encoding vector, $S_{min}$ is the diagonal matrix for the minimum spread tolerable using the current encoding scheme, and $Y_E$ is the encoding matrix.

Velvet noise reverberation often sounds smoother and generally more pleasant than gaussian white noise reverberation. This is relatively true, but it is also clear that the choice of echo density has a noticeable impact on this preference quality. Velvet noise pulses have 1-bit amplitudes. As the echo density is increased towards the sample rate, the embodiments also increase the bitdepth, and the noise function transitions into white noise. As a result, generally, increasing bitdepth reduces artifacts caused by 1-bit comb filtering. Smooth velvet noise approaches white noise as the echo density reaches the sample rate, and as the echo density drops, noticeable comb-filtering emerges.

Echo densities can be chosen based on a linear relationship to decay times, with longer decay times needing less echo density and shorter decay times needing more. Spectrally, velvet noise approaches white noise as echo density rises to the sample-rate. The lower the echo density from there, the smoother the noise profile, up until the density is so sparse that the echo density needs to be sufficiently dense in order to avoid perceivable comb-filtering artifacts in the reverberation.

In Some Embodiments, the Following Values were Chosen:

TABLE 1

| Decay Time | Density | Loop Length (samples) | Description |
|---|---|---|---|
| 250 ms | 3600/sec | 6144 | Short Diffuse |
| 1670 ms | 2400/sec | 16384 | Medium Diffuse |
| 3000 ms | 1200/sec | 20480 | Large Diffuse |
| 400 ms | 32/sec | 6144 | Sparse Specular* |

where * does not loop, nor is air attenuation applied so that the IR can be modelled with a cheaper tap-delay system.

Decay Time Approximation

Figure 10:
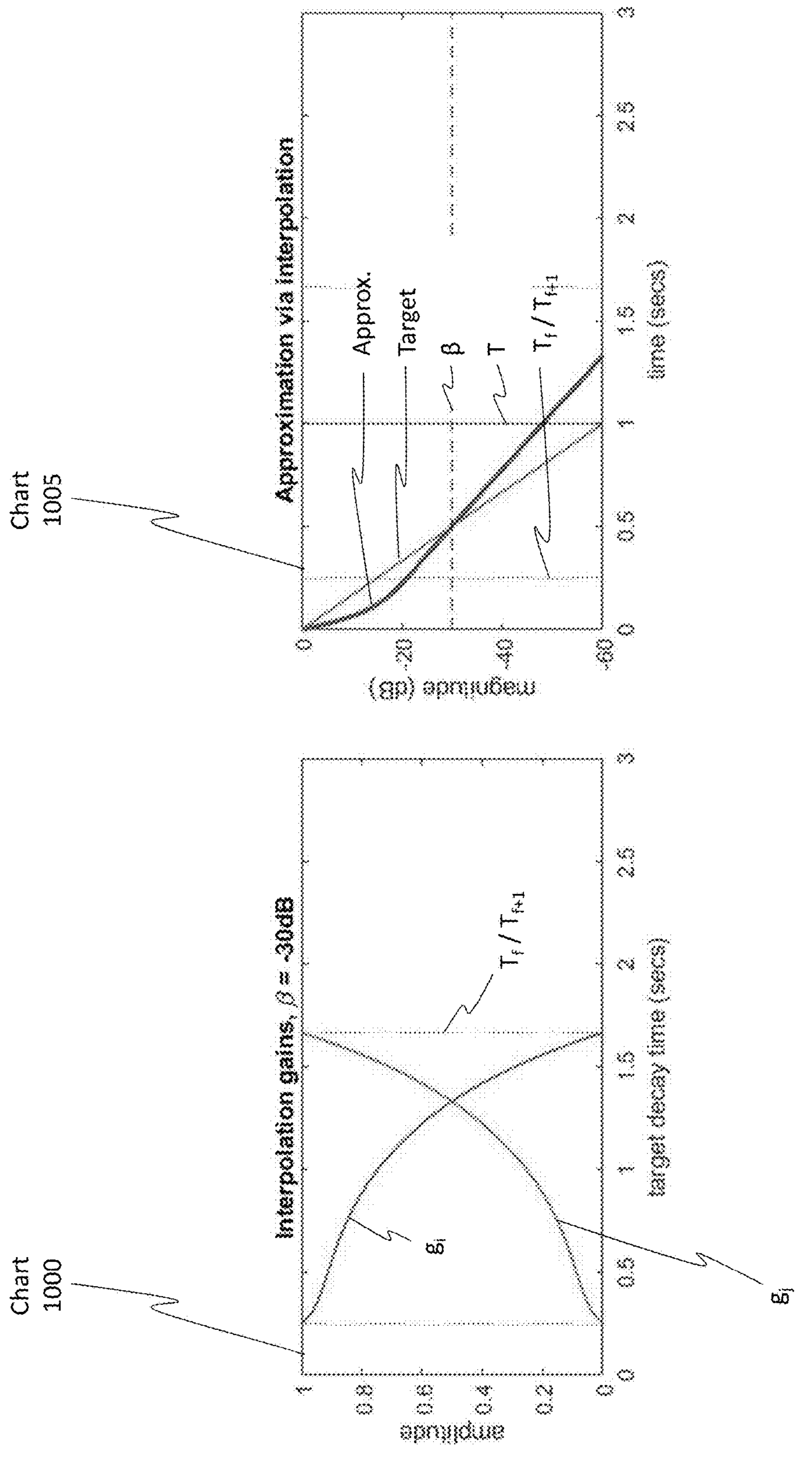
FIGS. 10, 11, and 12 illustrate various different plots of data associated with the reverberation effect.

FIG. 10 shows two charts (e.g., chart 1000 and chart 1005). These charts demonstrate the results of the above equations when $T_f$=0.25 secs, $T_f$+1=1.667 secs and β is −30 dB, which works well for most $T_f/T_f$+1 values and which corresponds to general understanding of the perceptual importance of the RT30 (or simply T30) midpoint within RT60 evaluations.

As mentioned previously, T60 refers to the amount of time that a reverberation can no longer be heard. A T60 of 1 second then means that after 1 second, the reverberation sound can no longer be heard by a listener. In this manner, the T60 time can be thought of as the reverberant length. The T60 can change periodically or even continuously for all sources. Thus, the embodiments are able to determine the T60 for each source at any given moment, and this computation can be performed in real time. The T60 computation will depend on where the source is located as well as where the listener is located. Thus, every source comes with its own T60 requirements and information. The fact that the embodiments are able to operate using a unique T60 for each source is also unique over traditional reverberation techniques. Traditional reverberation techniques required the T60 factor to be a setting on their filters, and any sound that comes in will be assigned that particular T60. Thus, the embodiments are able to achieve a per sound source property of T60, and the embodiments achieve that benefit without exploding the costs in terms of computation.

The T30 time is a relevant perceptual component because the T30 time (i.e. half of the T60 time) is a point in the time decay where a user's brain has figured out what the decay rate is. At the time corresponding to the T30 time, a person's brain has now been able to figure out the size of the room in which the sound occurred.

Chart 1000 shows the interpolation gains for a given target decay time. Chart 1005 shows how the approximation deviates from the target exponential function over time.

The selection of decay time pairs determines how perceptually sufficient the approximation will be. It has been found that using consecutive pairs from 3 decay times (0.25 s, 1.6667 s, and 3 s) is suitable for all RT60s in that range. For very detailed scenes, using more decay times will improve quality but is also more expensive. If it is desired to support RT60s outside of the 0.25 s to 3 s range, the embodiments can initiate additional filters.

Spread Control

The embodiments are able to pre-compute a table of Ambisonic parameters, such as the Schmidt semi-normalization (SN3D)-normalized parameters and Ambisonic channel number (ACN)-ordered spherical harmonics coefficients for 2048 positions over the full sound sphere. This table is encoded up to $2^{nd}$ order (9 channels), but the table can be expanded to higher orders if more resolution is needed in the future. The table is relatively small, taking only 72 KB for the full set (4*9*2048/1024=72), and the runtime set may be less depending on the desired channel configuration.

Encoding Spread

The Gerzon energy vector (rE) is a perceptual indicator used for localization. In-phase encoding is generally perceived as having smaller perceived source-width than with basic ambisonics (e.g., a full-sphere surround sound format) encoding and produces the maximum rE possible for a given ambisonics order.

For a given spherical harmonic order, the zonal harmonics (i.e. vertical-only spherical harmonics) that produce the maximum rE are those weighted by the roots of its associated Legendre polynomial:

TABLE 2

| Order | 0 | 1 | 2 | 3 | 4 |
|---|---|---|---|---|---|
| Max \|rE\| | 0 | ~0.5774 | ~0.78954 | ~0.8734 | ~0.9154 |

Mapping Spread and rE

Figure 11:
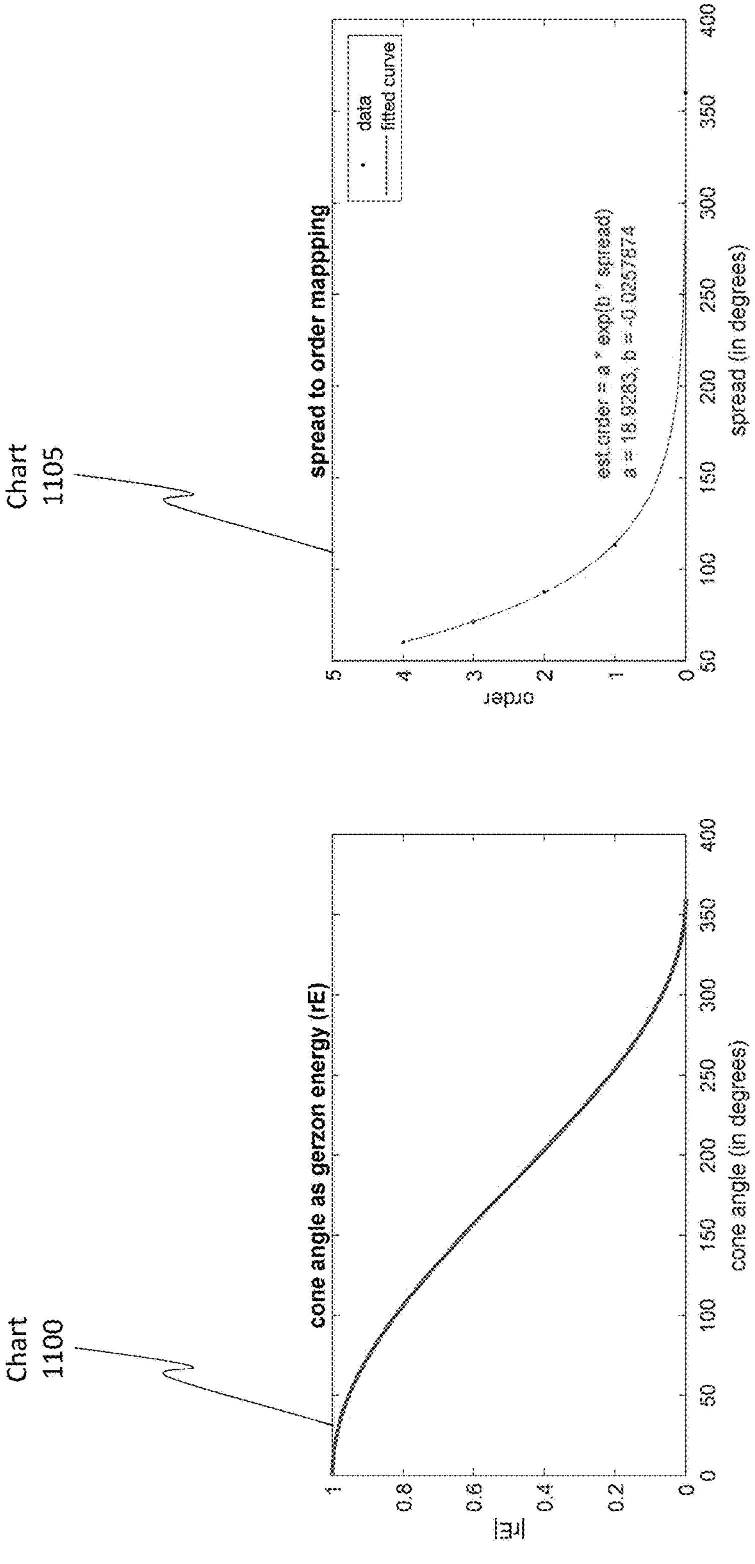

It can be assumed that a cone angle with the same rE as a given max-rE spherical harmonic function are perceived similarly. The embodiments can convert between spread and rE using a cosine function, as shown by the charts 1100 and 1105 in FIG. 11.

By applying this map to the ambisonics order max-rE values, the result is:

TABLE 3

| Order | 0 | 1 | 2 | 3 | 4 |
|---|---|---|---|---|---|
| Min Spread | 360 | 162.19 | 109.24 | 83.37 | 67.64 |

To map between rE and Order, it is possible to fit an exponential function to the per-order max-rE values using table 3.

Figure 12:
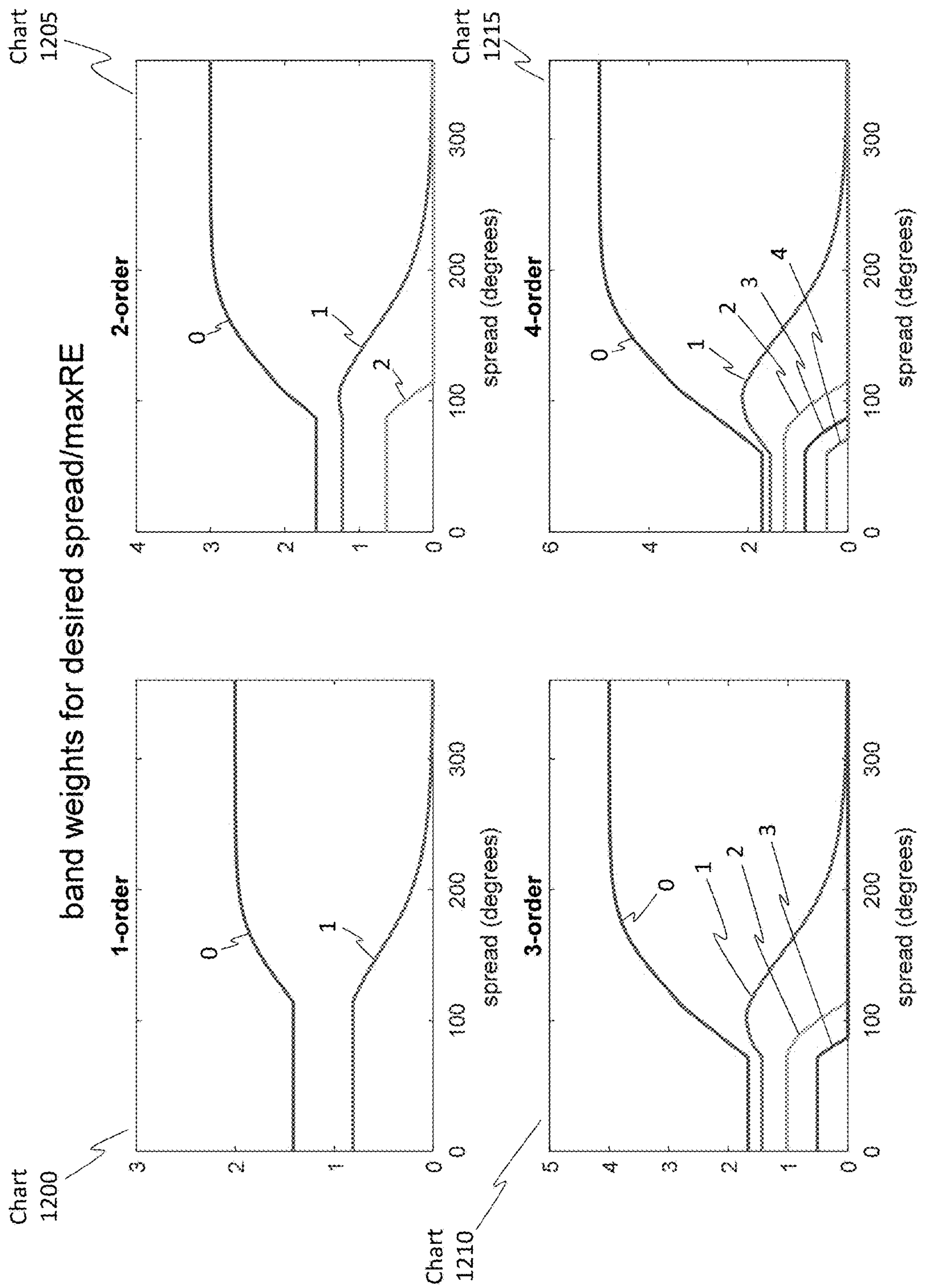

The embodiments assume that cone angles with the same rE as the max-rE spherical source are also similar in perceived source-width. Numerous sources have conflicting perceptual results, notably that anechoic conditions for source width are difficult to produce. The embodiments can then interpolate between max rE orders using polynomials and normalize its energy to produce a set of spherical harmonic band weights, for a desired rE, as shown by charts 1200, 1205, 1210, and 1215 of FIG. 12. Chart 1200 shows a 0 order plot and a 1 order plot. Chart 1205 shows a 0 order plot, a 1 order plot, and a 2 order plot. Chart 1210 shows a 0 order plot, a 1 order plot, a 2 order plot, and a 3 order plot. Chart 1215 shows a 0 order plot, a 1 order plot, a 2 order plot, a 3 order plot, and a 4 order plot.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13:
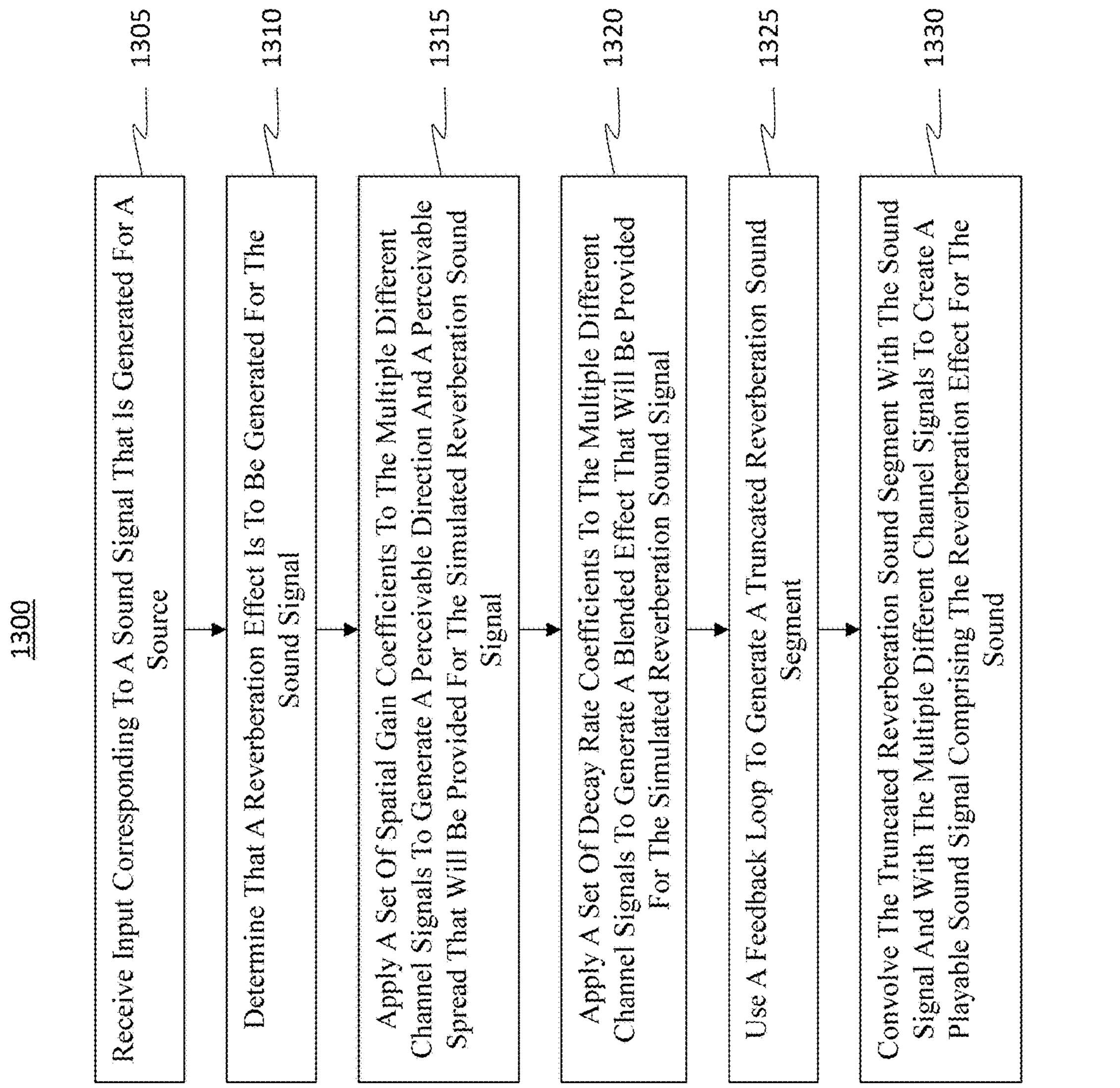
FIG. 13 illustrates a flowchart of an example method for generating a reverberation effect.

Attention will now be directed to FIG. 13, which illustrates a flowchart of an example method 1300 for generating a simulated reverberation sound signal that operates as a reverberation effect for a sound associated with a source, where the simulated reverberation sound signal is generated using a truncated sound signal that (i) repeats in a decaying manner over time, (ii) has a perceivable arrival direction that approximates where the sound originated, and (iii) has a given shape on a sound sphere. Method 1300 can be implemented using the service 605 of FIG. 6. Furthermore, the service 605 can use the multi-channel decoder 700 of FIG. 7 to perform the various operations.

Method 1300 includes an act (act 1305) of receiving input corresponding to a sound signal that is generated for a source. For instance, the input can be the input 705 shown in FIG. 7. In some implementations, the source can be a hologram displayed by a mixed reality system.

Act 1310 includes determining that a reverberation effect is to be generated for the sound signal. The reverberation effect 530 of FIG. 5 is representative. Notably, the reverberation effect includes a simulated reverberation sound signal that is generated from a combination of multiple different channel signals generated by a set of filters operating on the input. For instance, the channel signals 705A of FIG. 7 are representative.

Act 1315 includes applying a set of spatial gain coefficients (e.g., spatial gains 710 of FIG. 7) to the multiple different channel signals corresponding to each source input. Doing so results in the generation of a perceivable direction and a perceivable spread that will be provided for the simulated reverberation sound signal. For instance, the direction 710A and spread 710B shown in FIG. 7 are representative. The set of spatial gain coefficients can be obtained from metadata of the input. The perceived direction associated with the set of spatial gain coefficients can be an arrival direction of the simulated reverberation sound signal relative to a user who will hear the playable sound signal.

Act 1320 includes applying a set of decay rate coefficients (e.g., decay gains 810 of FIG. 8) to the multiple different channel signals. Doing so results in the generation of a blended effect (e.g., blend effect 810A of FIG. 8) that will be provided for the simulated reverberation sound signal. The set of decay rate coefficients can be obtained from metadata of the input.

Act 1325 includes using a feedback loop (e.g., feedback loop 925A shown in FIG. 9) to generate a truncated reverberation sound segment (e.g., output 930 shown in FIG. 9). The feedback loop generates the truncated reverberation sound segment by repeatedly convolving the truncated reverberation sound segment with itself multiple times and by causing each repeated version of the truncated reverberation sound segment to decay over time. In some implementations, a duration of each version of the truncated reverberation sound segment that is convolved is less than 1 second. In some cases, the duration is less than 0.5 seconds. Optionally, the process of using the feedback loop to generate the truncated reverberation sound segment can be performed using a feedback frequency response in which the truncated reverberation sound segment is caused to feedback on itself and to taper off in a repeating pattern.

Act 1330 includes convolving the truncated reverberation sound segment with the sound signal and with the multiple different channel signals to create a playable sound signal comprising the reverberation effect for the sound. The playable sound signal can be played back using a set of head-locked speakers disposed on an HMD. Beneficially, the playable sound signal has a decay path and a decay response over a determined rate.

In some implementations, method 1300 further includes an act of applying a head position matrix (e.g., head position matrix 735 shown in FIG. 7) to the playable sound signal. The process of applying the head position matrix operates to encode the playable sound signal based on a determined speaker configuration (e.g., perhaps a 5.1 speaker configuration). Optionally, the process of applying the head position matrix further acts to compensate for a rotational position of a head of a user that will hear the playable sound signal.

Optionally, a decay rate selected for the simulated reverberation sound signal can be different than a second decay rate used for a second simulated reverberation sound signal of a second sound. For instance, the embodiments are able to use distinct T60 values for each of the different sounds for the different sources. In some cases, decay rates that are applied to the multiple different channel signals to provide the blended effect can include a first decay rate of about 0.25 seconds, a second decay rate of about 0.69 seconds, a third decay rate of about 1.36 seconds, a fourth decay rate of about 1.54 seconds, and a fifth decay rate of about 3.0 seconds.

Method 1300 can further include an act of determining a location of a user who is to listen to the playable sound signal. Furthermore, method 1300 can include an act of determining an orientation of a head of the user. The data from these acts can be used to generate the head position matrix 735 of FIG. 7.

Figure 14:
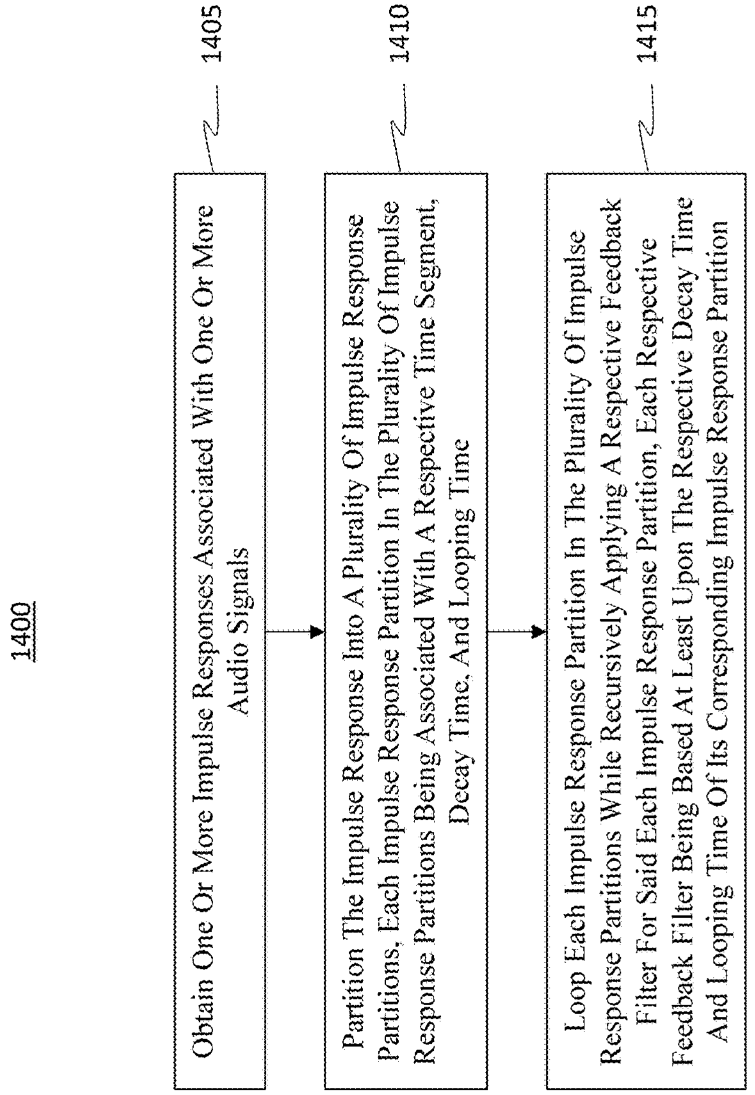
FIG. 14 illustrates a flowchart of another method for generating a reverberation effect.

FIG. 14 shows a different flowchart for a different method 1400 that can also be implemented by the service 605 of FIG. 6. Method 1400 is a technique for simulating multi-emitter spatial reverberation in order to determine one or more impulse response convolutions.

Method 1400 includes an act (act 1405) of obtaining one or more impulse responses (e.g., impulse response 925B of FIG. 9). These impulse responses are associated with one or more audio signals (e.g., input 705).

Act 1410 includes partitioning the impulse response into a plurality of impulse response partitions (e.g., impulse response partition 925C). Each impulse response partition is associated with a respective time segment, decay time, and looping time.

Act 1415 includes looping each impulse response partition in the plurality of impulse response partitions while recursively applying a respective feedback filter (e.g., the feedback frequency response 925 shown in FIG. 9) for each impulse response partition. Each respective feedback filter is based at least upon the respective decay time and looping time of its corresponding impulse response partition.

Notably, the decay time can be obtained from metadata of the one or more audio signals. Also, the metadata can further include a direction component for the one or more audio signals.

Accordingly, the disclosed techniques enable more immersive and accurate renderings of various acoustic spaces, while being incredibly efficient, able to support many sources and many output channels of reverb simultaneously. The embodiments employ several novel algorithms and combinations, including, for example, the means by which the embodiments calculate spatial gains, calculate decay time mixing coefficients, and generate efficient reverb filters with minimal computational costs. As used herein, the term "set" refers to one or more of something. A set thus should not be viewed as being empty. A "subset" refers to a portion of a set. For instance, if a set includes three items, then a subset of the set can include one item or two items, but the subset will not include all three items.

Example Computer/Computer Systems

Figure 15:
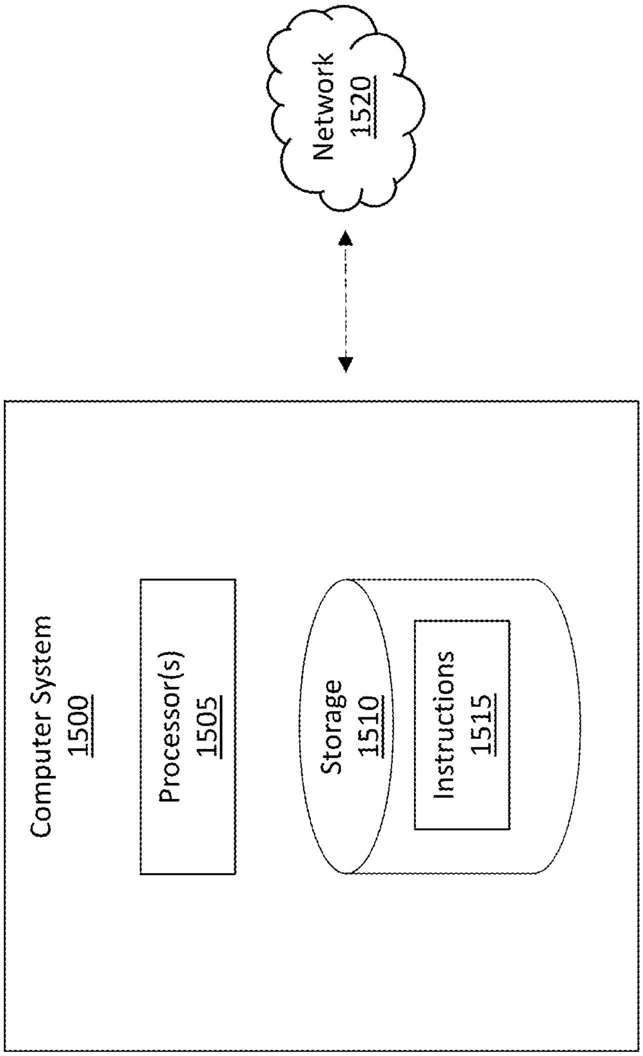
FIG. 15 illustrates an example computer system capable of performing any of the disclosed operations.

Attention will now be directed to FIG. 15 which illustrates an example computer system 1500 that may include and/or be used to perform any of the operations described herein. For instance, computer system 1500 can implement the service 605 from FIG. 6.

Computer system 1500 may take various different forms. For example, computer system 1500 may be embodied as a tablet, a desktop, a laptop, a mobile device, or a standalone device, such as those described throughout this disclosure. Computer system 1500 may also be a distributed system that includes one or more connected computing components/devices that are in communication with computer system 1500.

In its most basic configuration, computer system 1500 includes various different components. FIG. 15 shows that computer system 1500 includes one or more processor(s) 1505 (aka a "hardware processing unit") and storage 1510.

Regarding the processor(s) 1505, it will be appreciated that the functionality described herein can be performed, at least in part, by one or more hardware logic components (e.g., the processor(s) 1505). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1500. The different components, modules, engines, and services described herein may be implemented as objects or processors that execute on computer system 1500 (e.g. as separate threads).

Storage 1510 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1510 is shown as including executable instructions 1515. The executable instructions 1515 represent instructions that are executable by the processor(s) 1505 of computer system 1500 to perform the disclosed operations, such as those described in the various methods.

The disclosed embodiments may comprise or utilize a special-purpose or general-purpose computer including computer hardware, such as, for example, one or more processors (such as processor(s) 1505) and system memory (such as storage 1510), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote cameras) or devices via a network 1520. For example, computer system 1500 can communicate with any number devices or cloud services to obtain or process data. In some cases, network 1520 may itself be a cloud network. Furthermore, computer system 1500 may also be connected through one or more wired or wireless networks to remote/separate computer systems(s) that are configured to perform any of the processing described with regard to computer system 1500.

A "network," like network 1520, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1520. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a simulated reverberation sound signal that operates as a reverberation effect for a sound associated with a source, where the simulated reverberation sound signal is generated using a truncated sound signal that (i) repeats in a decaying manner over time, (ii) has a perceivable arrival direction that approximates where the sound originated, and (iii) has a given shape on a sound sphere, said method comprising:

receiving input corresponding to a sound signal that is generated for a source;

determining that a reverberation effect is to be generated for the sound signal, wherein the reverberation effect includes a simulated reverberation sound signal that is generated from a combination of multiple different channel signals generated by a set of filters operating on the input;

applying a set of spatial gain coefficients to the multiple different channel signals to generate a perceivable direction and a perceivable spread that will be provided for the simulated reverberation sound signal;

applying a set of decay rate coefficients to the multiple different channel signals to generate a blended effect that will be provided for the simulated reverberation sound signal;

using a feedback loop to generate a truncated reverberation sound segment, wherein the feedback loop generates the truncated reverberation sound segment by repeatedly convolving the truncated reverberation sound segment with itself multiple times and by causing each repeated version of the truncated reverberation sound segment to decay over time; and convolving the truncated reverberation sound segment with the sound signal and with the multiple different channel signals to create a playable sound signal comprising the reverberation effect for the sound.

2. The method of claim 1, wherein the method further includes:

applying a head position matrix to the playable sound signal, wherein applying the head position matrix encodes the playable sound signal based on a determined speaker configuration.

3. The method of claim 2, wherein applying the head position matrix further acts to compensate for a rotational position of a head of a user that will hear the playable sound signal.

4. The method of claim 1, wherein a duration of each version of the truncated reverberation sound segment that is convolved is less than 1 second.

5. The method of claim 4, wherein the duration is less than 0.5 seconds.

6. The method of claim 1, wherein the playable sound signal is played back using a set of head-locked speakers disposed on a head-mounted device (HMD).

7. The method of claim 1, wherein a decay rate selected for the simulated reverberation sound signal is different than a second decay rate used for a second simulated reverberation sound signal of a second sound.

8. The method of claim 1, wherein the set of spatial gain coefficients is obtained from metadata of the input.

9. The method of claim 1, wherein the set of decay rate coefficients is obtained from metadata of the input.

10. The method of claim 1, wherein using the feedback loop to generate the truncated reverberation sound segment is performed using a feedback frequency response in which the truncated reverberation sound segment is caused to feedback on itself and to taper off in a repeating pattern.

11. A computer system that generates a simulated reverberation sound signal that operates as a reverberation effect for a sound associated with a source, where the simulated reverberation sound signal is generated using a truncated sound signal that (i) repeats in a decaying manner over time, (ii) has a perceivable arrival direction that approximates where the sound originated, and (iii) has a given shape on a sound sphere, said computer system comprising:

at least one processor; and at least one hardware storage device that stores instructions that are executable by the at least one processor to cause the computer system to:

receive input corresponding to a sound signal that is generated for a source;

determine that a reverberation effect is to be generated for the sound signal, wherein the reverberation effect includes a simulated reverberation sound signal that is generated from a combination of multiple different channel signals generated by a set of filters operating on the input;

apply a set of spatial gain coefficients to the multiple different channel signals to generate a perceivable direction and a perceivable spread that will be provided for the simulated reverberation sound signal;

apply a set of decay rate coefficients to the multiple different channel signals to generate a blended effect that will be provided for the simulated reverberation sound signal;

use a feedback loop to generate a truncated reverberation sound segment, wherein the feedback loop generates the truncated reverberation sound segment by repeatedly convolving the truncated reverberation sound segment with itself multiple times and by causing each repeated version of the truncated reverberation sound segment to decay over time; and convolve the truncated reverberation sound segment with the sound signal and with the multiple different channel signals to create a playable sound signal comprising the reverberation effect for the sound.

12. The computer system of claim 11, wherein a location of a user who is to listen to the playable sound signal is determined.

13. The computer system of claim 12, wherein an orientation of a head of the user is also determined.

14. The computer system of claim 11, wherein decay rates that are applied to the multiple different channel signals to provide the blended effect include a first decay rate of about 0.25 seconds, a second decay rate of about 0.69 seconds, a third decay rate of about 1.36 seconds, a fourth decay rate of about 1.54 seconds, and a fifth decay rate of about 3.0 seconds.

15. The computer system of claim 11, wherein the playable sound signal has a decay path and a decay response over a determined rate.

16. The computer system of claim 11, wherein the perceived direction associated with the set of spatial gain coefficients is an arrival direction of the simulated reverberation sound signal relative to a user who will hear the playable sound signal.

17. The computer system of claim 11, wherein the source is a hologram displayed by a mixed reality system.

* * * * *